United States Patent
Singer et al.

(10) Patent No.: US 10,230,262 B2
(45) Date of Patent: Mar. 12, 2019

(54) APPARATUS AND METHOD FOR SWITCH STATE DETECTION AND CONTROLLING ELECTRICAL POWER

(71) Applicants: Neil Singer, Armonk, NY (US); John Anthony Granata, Armonk, NY (US); Kenneth Alan Pasch, Dover, MA (US); Stewart Wallach, Delray Beach, FL (US)

(72) Inventors: Neil Singer, Armonk, NY (US); John Anthony Granata, Armonk, NY (US); Kenneth Alan Pasch, Dover, MA (US); Stewart Wallach, Delray Beach, FL (US)

(73) Assignee: CAPSTONE LIGHTING TECHNOLOGIES, LLC., Deerfield Beach, FL (US)

( * ) Notice: Subject to any disclaimer, the term of this patent is extended or adjusted under 35 U.S.C. 154(b) by 0 days.

(21) Appl. No.: 15/213,963

(22) Filed: Jul. 19, 2016

(65) Prior Publication Data
US 2016/0329743 A1    Nov. 10, 2016

Related U.S. Application Data

(63) Continuation of application No. 14/147,305, filed on Jan. 3, 2014, now Pat. No. 9,425,649.

(51) Int. Cl.
*H02J 9/06* (2006.01)
*H05B 37/04* (2006.01)
(Continued)

(52) U.S. Cl.
CPC ......... *H02J 9/061* (2013.01); *H05B 33/0884* (2013.01); *H05B 37/02* (2013.01);
(Continued)

(58) Field of Classification Search
CPC ........ H05B 37/02; H05B 37/04; H05B 41/14; H05B 41/46
See application file for complete search history.

(56) References Cited

U.S. PATENT DOCUMENTS

| | | |
|---|---|---|
| 3,976,986 A | 8/1976 | Zabroski |
| 4,410,835 A | 10/1983 | Zabroski |

(Continued)

FOREIGN PATENT DOCUMENTS

| | | |
|---|---|---|
| CN | 102625535 A | 8/2012 |
| EP | 0 534 793 B1 | 2/1996 |

OTHER PUBLICATIONS

"Maxwell Technologies Ultracapacitors Back-up Power" © 2013 Copyright Maxwell Technologies, Inc., www.maxwell.com/products/ultracapacitors/industries/backup-power, Jan. 2, 2014.
(Continued)

*Primary Examiner* — Douglas W Owens
*Assistant Examiner* — Pedro C Fernandez
(74) *Attorney, Agent, or Firm* — Oblon, McClelland, Maier & Neustadt, L.L.P.

(57) ABSTRACT

A device includes a connection receiving power from a power source under normal conditions and circuitry configured to determine, based on an input from the connection, when the power from the power source is absent; output, when the power source is absent, a test signal at the connection; and generate a detection signal based on current flow generated following the output of the test signal, wherein the detection signal indicates a position of a switch connecting the circuitry to the connection and the generated detection signal indicates the switch is closed when the current flow is above a threshold. The circuitry is configured such that when the power from the power source is absent, the switch is closed, and plural devices are connected on the supply side of the switch, the plurality of devices on the (Continued)

supply side appear as a substantially open circuit to the test signal.

18 Claims, 13 Drawing Sheets

(51) Int. Cl.
  *H05B 37/02* (2006.01)
  *H05B 41/46* (2006.01)
  *H05B 33/08* (2006.01)
  *H05B 41/14* (2006.01)
(52) U.S. Cl.
  CPC ......... *H05B 37/0227* (2013.01); *H05B 37/04* (2013.01); *H05B 41/14* (2013.01); *H05B 41/46* (2013.01); *H05B 33/0842* (2013.01); *Y10T 307/865* (2015.04)

(56) References Cited

U.S. PATENT DOCUMENTS

| | | |
|---|---|---|
| 5,303,124 A | 4/1994 | Wrobel |
| 5,526,236 A | 6/1996 | Burnes et al. |
| 5,734,229 A | 3/1998 | Bavaro et al. |
| 5,911,499 A | 6/1999 | Stafford et al. |
| 6,107,744 A | 8/2000 | Bavaro et al. |
| 6,239,736 B1 | 5/2001 | McDonald et al. |
| 6,347,028 B1 | 2/2002 | Hausman, Jr. et al. |
| 6,605,900 B2 | 8/2003 | Chien |
| 6,900,595 B2 | 5/2005 | Cojocary |
| 7,218,056 B1 | 5/2007 | Harwood |
| 7,298,098 B2 | 11/2007 | Wang |
| 7,703,934 B2 | 4/2010 | Pape et al. |
| 8,033,686 B2 | 10/2011 | Recker et al. |
| 8,125,184 B2 | 2/2012 | Raji et al. |
| 8,299,712 B2 | 10/2012 | Smith, III et al. |
| 2005/0157482 A1 | 7/2005 | Hsu |
| 2007/0024246 A1 | 2/2007 | Flaugher |
| 2007/0133199 A1 | 6/2007 | Lebens et al. |
| 2007/0247840 A1 | 10/2007 | Ham |
| 2009/0059603 A1 | 3/2009 | Recker et al. |
| 2010/0194277 A1 | 8/2010 | Yoo |
| 2010/0327766 A1* | 12/2010 | Recker ............... H02J 9/02 315/291 |
| 2012/0098655 A1 | 4/2012 | Preta et al. |
| 2012/0126699 A1 | 5/2012 | Zittel |
| 2012/0262093 A1 | 10/2012 | Recker et al. |

OTHER PUBLICATIONS

Shailendra Suman, "SmartCharge™ Never Be in the Dark Again", www.kickstarter.com/projects/127019135/smartchargetm-never-be-in-the-dark-again, Dec. 2, 2013.

International Search Report and Written Opinion dated Mar. 18, 2015 in PCT/US2014/070763, filed Dec. 17, 2014.

* cited by examiner

APPARATUS AND METHOD FOR SWITCH STATE DETECTION AND CONTROLLING ELECTRICAL POWER

CROSS-REFERENCE TO RELATED APPLICATIONS

This application is a continuation of and claims the benefit of priority under 35 U.S.C. § 120 from U.S. application Ser. No. 14/147,305, filed Jan. 3, 2014, the entire contents of which are incorporated herein by reference.

BACKGROUND

Technical Field

The present disclosure relates to devices and methods for controlling electrical power during power failure.

Description of Related Art

Devices are available for delivering electrical power to a load when a main source of electrical power to the load is absent. For example, emergency lighting may be provided during a power outage by switching the lighting power source to a backup battery.

In an effort to provide switching capability to control battery utilization, power failure products may include a switching feature using variations of an impedance test on the line. The impedance test is designed to determine whether a normal upstream switch is open or closed. The concept is to send a signal over a line that is modulated, and thereby measure the line impedance. By comparing the impedance of the circuit with the switch closed and with the switch open (during power failure), it is theoretically possible to determine the switch state.

SUMMARY

The problem with providing battery backup power to lighting and other equipment is that battery life is always limited. Battery life limitations may be due to size constraints, cost constraints, environment and usage factors, and other constraints. For instance, state-of-the-art batteries that occupy small volumes are relatively expensive. Moreover, less expensive batteries using older technology are often heavy and occupy a larger volume, which is unsuitable in many applications. In any case, battery backup power is a limited resource, especially in emergency conditions such as power outages where supplying power to certain loads may be critical.

Under the backdrop of this battery limitation, it is desirable to create a line of products that only use battery power during power failure when the power is needed. Many existing power failure lighting products will automatically turn on as soon as main power is removed from the product. The problem with this approach is that occupants of the building may not need the backup light immediately (i.e., when the power fails). In fact, the occupants of the building may not even be present. Thus, the limited battery power resource may be wasted by such devices.

Further, as discussed previously, an impedance test may be used to determine a switch position state during power failure. However, practical considerations make measuring impedance to determine a switch position state a difficult prospect.

First, there is the issue of learning what impedance should be present when the switch is open and learning what impedance should be present when the switch is closed. Measuring the impedance of the circuit with the switch open can be performed whenever the switch is open, regardless of condition of power failure, and stored for later reference. Measuring the impedance of the circuit with the switch closed can only be performed during power failure. Moreover, these measurements will vary in every application, complicating the implementation. These measurements may vary over time depending on what devices are on the same circuit and on the state of other switches in the house.

Second, in order to conduct an impedance test, considerable power is required. This power is consumed at the worst possible time—during power failure. It is during power failure, when conservation of the battery is most important, that such a device must constantly be sending out an electrical signal and calculating the impedance.

Third, there is a direct trade-off between how often the impedance test is conducted and the time delay between the time the switch is thrown by an occupant and the time the circuit reacts to the change. If the impedance testing is done frequently in order to minimize the time delay, the battery consumption is increased.

Lastly, cost is a considerable problem for this design. For example, a processor or complex circuitry may be required in order to conduct an impedance test.

Other attempts at making a switchable circuit are plagued by a common problem—the restriction of only one device on a single switched circuit. This is a significant limitation because most applications would require that the device should continue to work with multiple devices on a circuit. For the light socket example, a house would typically have several lights controlled by one switch. In this instance, the other bulbs on the circuit would draw current and confuse a circuit trying to sense the difference between a power failure situation and the switch being opened (turned off). The present disclosure solves this problem.

Rather than automatically powering a device with a backup battery during a failure of the device's main power source, it is desirable that the battery backed-up device may be controlled by the same switch (e.g., a wall-mounted light switch) that controls the device when power is being supplied through the alternating current (AC) mains. Further, it is desirable to determine a position state of the wall switch while mitigating the aforementioned drawbacks of devices utilizing impedance testing.

Among other things, the present disclosure describes features of commercially viable, switchable power failure products that allow a user to power-on, via a switch, an electrical load with a backup battery during a power failure when power to the device is needed, and to power-off the device via the switch when the device is not needed. In particular, the present disclosure describes circuitry that may be configured to determine the position of an electrical switch during a power failure. During normal operation when power is being supplied to a building, a wall switch controls the flow of electricity from the AC mains to a load (e.g., lights). During a power outage there is no voltage from the mains. Therefore, by determining the position of the switch (even though there is no power being supplied by the mains), the occupant of the building is able to control battery backed-up lights or other devices during a power outage. By enabling the selective control of power to the backed-up device, battery life is maximized and the backed-up device becomes commercially useful even with limited battery capacity.

In one embodiment, a device includes a main power connection that receives power from a main power source under normal conditions. The device includes circuitry configured to determine, based on an input from the main power connection, when the power from the main power source is absent. The circuitry is configured to output, when the main power source is absent, a test signal at the main power connection. The circuitry is configured to generate a switch state detection signal based on current flow generated as a result of the output of the test signal, wherein the switch state detection signal indicates a position of a switch that connects the main power connection to the main power source. The circuitry is configured to generate the switch state detection signal to indicate the switch is closed when the current flow is above a threshold. The circuitry is configured such that when the power from the main power source is absent, the switch is closed, and a plurality of devices are connected on the supply side of the switch, the plurality of devices on the supply side of the circuit appear as a substantially open circuit to the test signal.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
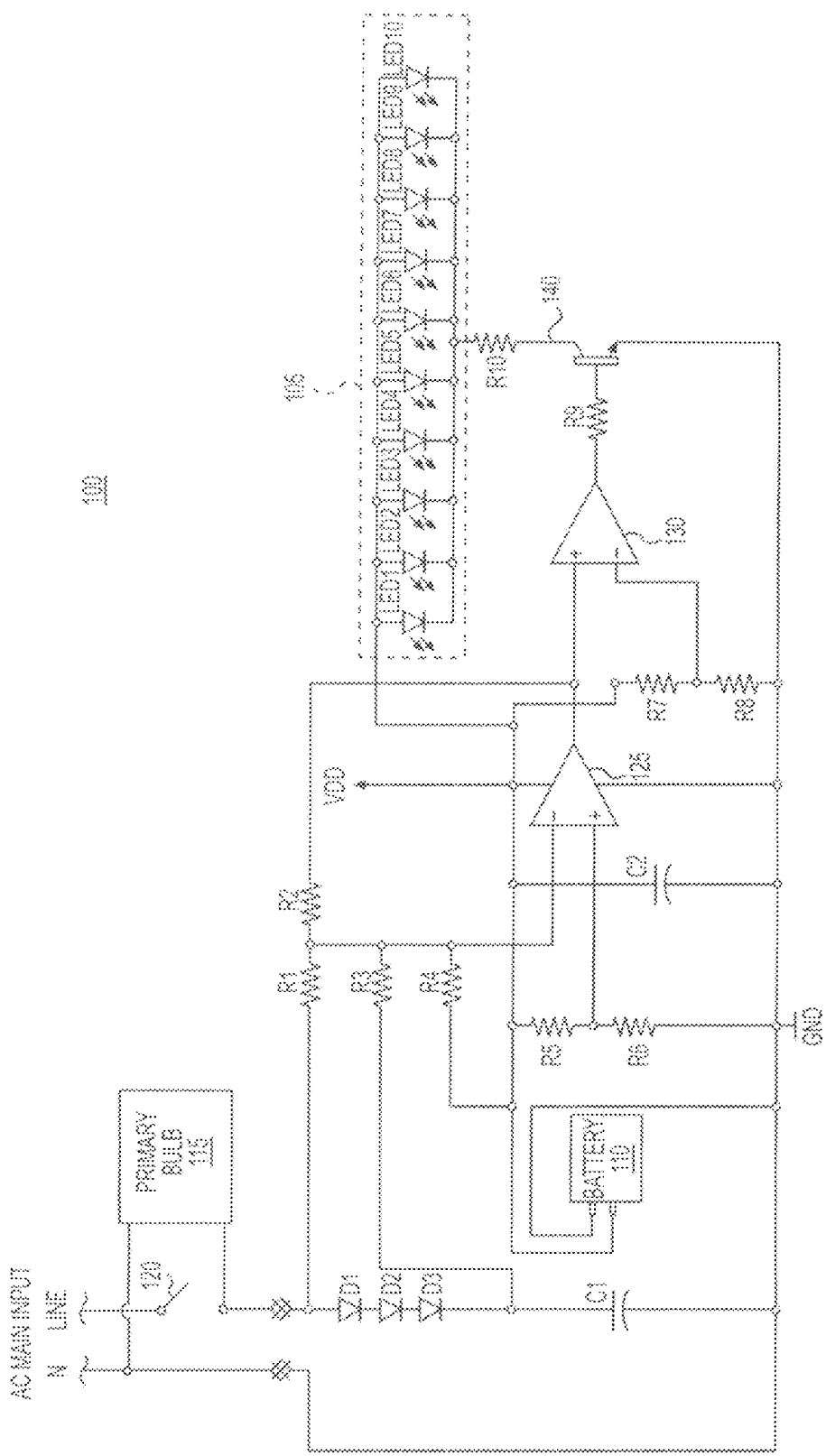
FIG. 1 illustrates non-limiting exemplary circuitry for detecting an electrical switch position and controlling power to a load during power failure, according to certain embodiments.

Referring now to the drawings, wherein like reference numerals designate identical or corresponding parts throughout the several views.

FIG. 1 illustrates non-limiting exemplary circuitry for detecting an electrical switch position and controlling power to a load during power failure, according to certain embodiments. In examples discussed herein, the switch state detection circuitry (and other related circuitry) of FIG. 1 may be included in a backup power device (e.g., a lighting circuit, a light bulb, a light fixture, a light switch, timer, motion sensing device, etc.) and therefore, for simplicity, certain examples provided herein may reference features in view of such a backup power device. However, it should be appreciated that the features described herein may be embodied as stand-alone circuitry, and such features should not be construed as being limited to any particular device type. Further, examples described herein may describe powering a "primary" load during normal power conditions (i.e., main power available) and a separate "backup" load when the main power source is absent (e.g., main power failure). However, such an implementation is not limiting, and a skilled artisan will appreciate that, within the scope of the present disclosure, a single load may serve as both the primary and backup load. For example, a light may be powered by AC main power under normal conditions and then switched to backup power (e.g., from a battery) when the main power source is absent. In fact, the primary load may be fully powered, partially powered ("dimmed"—in the context of lighting), or powered in part. Powered in part means, in this context, having certain aspects of the primary load powered (either partially or fully) while other aspects are unpowered or partially powered. As a non-limiting example in the context of lighting this could mean powering some or all LED's as the primary source when the mains are present and powering a subset of the LEDs during backup conditions. Again as a further non-limiting example, the brightness of the LED's in the two situations can be altered in a variety of ways.

Referring to FIG. 1, according to certain embodiments, switch state detection circuit 100 of FIG. 1 provides power to a lighting circuit 105 in power failure situations. In certain embodiments, the lighting circuit 105 may include one or more light-emitting diode (LED) elements. The exemplary lighting circuit 105 of FIG. 1 includes ten LED elements (LED1 through LED10). However, the number of LED elements illustrated in this example is not limiting. Further, the present disclosure may be adapted such that the lighting circuit 105 is replaced with a different electrical load. Moreover, electrical loads used in lieu of the lighting circuit 105 are not limited to lighting devices. The LEDs 1 through 10 may each have an internal series resistor (e.g., 15Ω) that helps to distribute the current among the LEDs.

In certain embodiments, backup power to the lighting circuit 105 may be supplied from a battery 110, which may, e.g., be a lithium ion (Li-ion) type battery. In addition to supplying power to the lighting circuit 105, the battery 110 output may be controlled to supply a test signal (e.g., small direct current (DC) signal) to the AC mains as part of the switch state detection features performed by the switch state detection circuit 100. In certain embodiments, the test signal may be supplied to the AC mains via a power connection for a primary bulb 115. For example, in the case of lighting, a socket-type connection may be connected to the switch state detection circuit 100 such that the primary bulb 115 may be powered via the AC mains in a normal power state (i.e., when power has not failed), and the test signal may be supplied to the AC mains for switch state detection during power failure conditions (or under normal conditions).

Current flow from the battery 110 may be controlled based on a position/state of switch 120, which may, e.g., be a wall switch for controlling power to a local circuit including the primary bulb 115. For the purposes of the present disclosure, a local circuit may be represented as a lighting circuit for a room, which may include any loads on the lighting circuit prior to tying back into the circuit breaker panel. Aspects of controlling elements of the switch state detection circuit 100 based on the detected position of the switch 120 will be discussed in later paragraphs at least with respect to FIG. 2.

For the purposes of the present disclosure, it is assumed that the primary bulb 115 is a lighting device having diodes in the bridge rectifiers of its electronic ballast (e.g., an LED or compact fluorescent lamp (CFL)). However, in certain embodiments, other electronic devices having control circuitry/switching power supplies that prevent the test signal from "getting over" their inherent voltage drop may also be connected to the local circuit. Under the above assumption regarding the primary bulb 115 (or other devices on the local circuit), the primary bulb 115 draws substantially zero current when the test signal is applied. Thus, the switch state detection circuit 100 will only produce a non-zero output signal when the switch 120 is closed and the test signal is applied because only then is the local lighting circuit connected to a phase (e.g. one of two split phases) controlled by the main circuit breaker. The main circuit breaker is connected to all switched-on household devices, the power transformer, and the other houses that will draw current from the applied test signal when the switch 120 is closed.

As will be discussed later, the switch state detection circuit 100 may, in certain embodiments, include circuitry for detecting a non-compatible device (i.e., a device not meeting the aforementioned assumption conditions). For example, a detection of primary bulb 115 current above a predetermined threshold may indicate an incompatible device is installed.

In certain embodiments, the detection of the switch 120 state may be accomplished through the use of amplifier 125. As a non-limiting example, in certain embodiments, the switch state detection circuit 100 may include a CMOS MCP6002 low-power operational amplifier. This dual package chip provides the benefits of rail-to-rail output, low quiescent current (and thus low power dissipation), and 200V electrostatic discharge (ESD) protection on the inputs. $V_{DD}$ for the MCP6002 is the cell voltage of the battery 110. In certain embodiments, the cell voltage of the battery 110 may vary between 3V and 4.2V. One of the operational amplifiers in the MCP6002 chip may be configured as the amplifier 125 with summing at the inverting input of the amplifier 125. In certain embodiments, a second operational amplifier in the MCP6002 chip may function as a comparator (e.g., comparator 130 in FIG. 1), generating an output voltage ($V_{SS}$ or $V_{DD}$) that is put across an appropriately sized base resistor R9 of an NPN transistor 140. When $V_{SS}$ is output across the resistor R9, the NPN transistor 140 is in the "on" state, which results in one terminal of the lighting circuit 105 being connected to ground such that the LEDs 1 through 10 are illuminated. Conversely, when $V_{DD}$ is output from the comparator 130, the NPN transistor 140 is in the "off" state, which prevents current flow through the lighting circuit 105.

Three diodes D1 through D3 are wired in series between the AC main input of the switch state detection circuit 100 and a capacitor C1. The diodes D1 through D3 provide a voltage drop of sufficient magnitude to prevent the test signal from "seeing" any other lighting circuits or other devices connected to the local circuit of FIG. 1. As a result, errors in the detection features of the switch state detection circuit 100, which may be caused by the presence of the other devices and lighting circuits, including other instances of circuitry consistent with the present disclosure, are prevented. It is noted that the present disclosure is not limited to a particular quantity of diodes at the AC main input, and a skilled artisan will appreciate that the quantity and type of diode (or other similar circuit element) may be modified from the examples described herein while still being consistent with the above-described function of the diodes D1 through D3. For example, two diodes may be included in switch state detection circuitry in accordance with the features of the present disclosure, whereby the two diodes may correspond to diodes included in CFL ballasts that may be included on the local circuit. Further, the selection of diode (or other similar circuit element) quantity and related performance features may be based on the test signal level applied in the circuitry.

In the exemplary circuit of FIG. 1, a resistor may be used between the AC mains voltage and the amplifier 125 inverting input, as well as between the AC mains voltage and the comparator 130 non-inverting input. This configuration results in a large voltage drop across the resistor(s). In certain embodiments that include a microcontroller in lieu of the comparator 130, two resistors in series (each equal to half the original resistance in the corresponding analog embodiments) may be used in order to lessen the voltage drop across each resistor in accordance with part tolerances (e.g., to avoid component flashover in the case of an over voltage transient on the mains).

In certain embodiments, the voltage on the non-inverting input of the amplifier 125 is equal to half the cell voltage of the battery 110. This input may be created by a voltage divider that includes resistors R5 and R6. In certain embodiments, the resistors R5 and R6 may be 270 kΩ resistors. Several inputs are summed at the inverting input of the amplifier 125 via resistors R1, R3, and R4, as well as feedback resistor R2. In certain embodiments, resistors R1, R2, and R4 may also be 270 kΩ resistors. As discussed in later paragraphs, the value of the resistor R3 may be lower than the respective values of the resistors R1, R2, and R4 such that a voltage resultant from charging the capacitor C1 may dominate other input signals to the amplifier 125.

In certain embodiments, the voltage at the inverting input of the comparator 130 op-amp may be slightly less than half of the battery 110 voltage in order to ensure that an output of magnitude $V_{DD}$ from the amplifier 125 causes the comparator 130 output to stay low when the switch 120 is open. In certain embodiments, the voltage input to the comparator 130 may be set using a voltage divider including resistors R7 and R8, which may, e.g., be 300 kΩ and 270 kΩ resistors, respectively.

In certain embodiments, the capacitor C1 may be selected such that the LEDs 1 through 10 turn on quickly during power failure. In other words, the capacitor C1 may be sized such that the time for the capacitor to discharge is not so high as to cause an unnecessary delay in illuminating the lighting circuit 105. In certain embodiments, the capacitor C1 may also be sized to sufficiently compensate for ripple of the AC line voltage during charging of the capacitor C1. The present example of FIG. 1 assumes a 0.1 μF capacitor is used; however, this capacitance value is in no way limiting.

Figure 2:
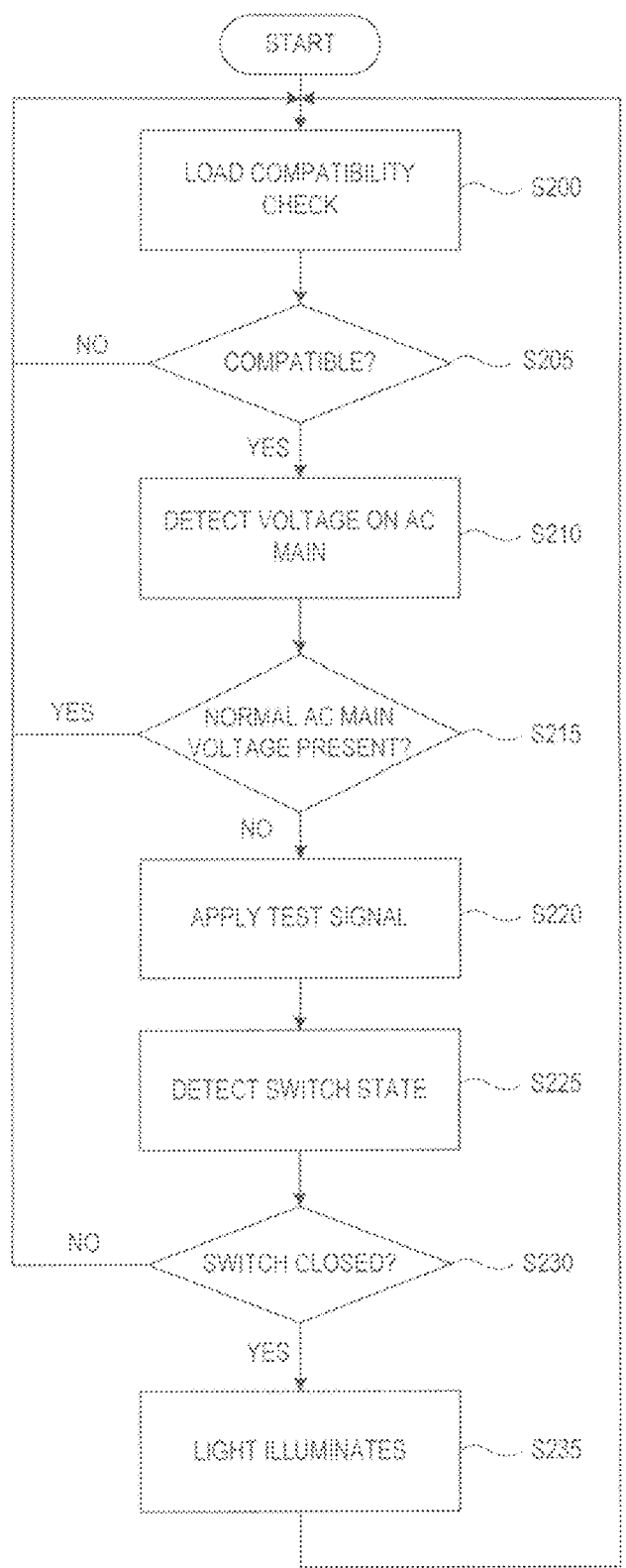
FIG. 2 illustrates a non-limiting exemplary flowchart for detecting an electrical switch position and controlling power to a backup load during power failure, according to certain embodiments.

A unique feature of the switch state detection circuit 100 is its ability to provide, even during power failure situations, control over the illumination of the lighting circuit 105 based on the state detection of the switch 120. FIG. 2 illustrates a non-limiting exemplary flowchart for detecting an electrical switch state and controlling power delivery to a load based on the switch state determination, according to certain embodiments. The process of FIG. 2 is discussed in reference to the exemplary circuitry of FIG. 1. However, it should be appreciated that the process of FIG. 2 may be applied to other hardware and/or software embodiments consistent with the features described herein. Moreover, as mentioned previously, for simplicity the example of FIG. 2 assumes a separate load (i.e., lighting circuit 105) is powered when main power is absent. However, the process of FIG. 2 may be adapted such that the same load is powered by the AC mains and the battery (e.g., by converting the AC main input to power a battery-powered load, or vice versa).

Referring first to step S200, the switch state detection circuit 100 performs a load compatibility check to determine whether electrical loads connected to a local circuit in parallel with the switch state detection circuit 100 (e.g., the primary bulb 115) are compatible with the switch state detection circuit 100. If it is determined that conditions on the circuit indicate one or more non-compatible loads are connected to the local circuit, the process at step S205 continues performing the compatibility check until conditions on the circuit are sufficient to continue. In certain embodiments, a fault indicator may also be output at step S200. Exemplary load compatibility circuitry that may be included in the switch state detection circuit 100 will be discussed later at least with respect to FIG. 9.

At step S210, the voltage present on the AC mains is detected. If the normal AC mains voltage (e.g., 110-120 VAC) is detected by the switch state detection circuit 100 at step S215, it is determined that the switch 120 is closed and power failure has not occurred. Therefore, the LEDs 1 through 10 in the lighting circuit 105 do not turn on, and the process returns to step S200.

As a non-limiting example of step S210, referring to the exemplary circuitry of FIG. 1, if an AC main voltage is present at the switch state detection circuit 100 input, the capacitor C1 will get charged through diodes D1 through D3, and this voltage is put across resistor R3, which has a lower value than resistors R1 and R4 (e.g., 150 kΩ versus 270 kΩ) in order to allow this signal to dominate other signals (if present) in the path to the inverting input of the amplifier 125. The input signal to the amplifier 125 in this circumstance would quickly cause the output of the amplifier 125 to go to $V_{SS}$, which would put $V_{SS}$ across the base resistor R9 (which may be a 270 kΩ resistor), thereby preventing the NPN transistor 140 from turning on. As a result of the NPN transistor not turning on, the path to ground in the lighting circuit 105 is open, thereby preventing the LEDs 1 through 10 from illuminating.

In the above-described example in which the LEDs in the lighting circuit 105 do not turn on due to the presence of the AC main voltage, the primary bulb 115 may, in certain embodiments, receive its power through dimming circuitry that controls power flow from the mains to the primary bulb 115 in order to keep the battery 110 temperature under a predetermined temperature threshold (e.g., 60° C.). Aspects of this feature will be described in further detail in later paragraphs at least with respect to FIG. 9.

Referring back to FIG. 2, if normal AC mains voltage is absent at step S215, the switch state detection circuit 100 applies the test signal to the AC mains input line at step S220. In certain embodiments, the test signal is less than 3V. However, this test voltage value is not limiting, and those or ordinary skill will appreciate that the test voltage may be selected such that the compatible devices on the local circuit do not draw a current (or draw negligible current) when the test voltage is applied such that the switch state detection circuit 100 will only produce a non-zero output signal (or an output above a suitable minimum threshold) when the switch 120 is closed. That is, the aforementioned test signal voltage value is in no way limiting, and the test signal may be selected such that loads connected to a local circuit on which the switch state detection circuit 100 is (or will be) connected appear as substantially open circuits when the test signal is applied to the AC mains. Further, it is noted that the test signal may be based on the voltage of the battery 110. In certain embodiments, the test signal may correspond to a voltage drop for one or more diodes in a bridge rectifier of a device connected to the local circuit on which the switch state detection circuit 100 is (or will be) connected.

Next, the switch state detection circuit 100 detects the position of the switch 120 (i.e., open or closed) at step S225. As a non-limiting example referring to the exemplary circuitry of FIG. 1, when the switch 120 is closed, the test signal at step S225 will be put across any loads connected to the same main circuit breaker phase (i.e., any other loads upstream of the switch state detection circuit 100 on the AC mains that do not appear as open circuits to the test signal). This causes a current to flow into the inverting input of the amplifier 125, thereby creating a voltage input (a signal between $V_{SS}$ and $V_{DD}$) to the non-inverting input of the comparator 130 (it is noted that in certain embodiments, the comparator 130 may be replaced with a microcontroller, as will be discussed in detail in later paragraphs). When the output of the amplifier 125 exceeds a predetermined threshold, the comparator 130 outputs a voltage across the base resistor R9 of the NPN transistor 140, which causes the NPN transistor 140 to conduct and allows current to flow through the LEDs 1 through 10. In other words, when there is no AC voltage present on the mains and the switch 120 is closed, the voltage output of the amplifier 125 will be higher than the reference on the inverting input of the comparator 130 op-amp. This will cause the output of the comparator 130 to go high, putting a voltage across the resistor R9 connected to the base of the NPN transistor 140 that is sufficient to trigger the NPN transistor 140 to close. This creates a path from power to ground through the lighting circuit 105, which causes the LEDs 1 through 10 to illuminate.

In embodiments where features of the comparator 130 are performed by a microcontroller, the output of the amplifier 125 may be connected to a digital input of the microcontroller that polls the pin state. When the microcontroller detects a transistor-transistor logic (TTL) "high" state, the microcontroller may generate a variable duty-cycle pulse width modulated (PWM) signal (e.g., at 120 Hz) that feeds into the gate of a low-threshold MOSFET wired in series with the base of the ten LEDs in the lighting circuit 105 (which is a single node because the LEDs are wired in parallel in this example). In certain embodiments, brightness of the LEDs 1 through 10 is maintained as the battery 110 voltage drops because the measured battery voltage is used to compute the duty cycle applied to the gate of the MOSFET.

Referring back to step S230 of FIG. 2, if the AC main voltage is not present and the switch 120 is open, the voltage output of the amplifier 125 ($V_{DD}$) will be lower than the reference on the inverting input of the comparator 130 op-amp. This will cause the output of the comparator 130 to go to the low state, which results in the input to the base of the NPN transistor 140 being below the threshold for the NPN transistor to transition to the "on" state. Thus, there is an open path to ground through the lighting circuit 105 and therefore, the LEDs 1 through 10 do not illuminate.

In certain embodiments, the above-described analog circuitry can be paired with an inexpensive Li-ion battery charging solution and two thermal cut-outs (TCOs). In this case, one thermal cut-out can halt battery charging at a predetermined temperature threshold (e.g., 40° C.), and another could cut power to the primary bulb 115 at another predetermined threshold (e.g., 60° C.).

Next, in certain embodiments, a digital implementation of features described herein may be executed using a microcontroller (MCU) such as Microchip P1C16F1937 Enhanced Mid-range microcontroller, which is an 8-bit CMOS MCU with the peripherals for executing the digital implementation of switch state detection and power control features described herein.

Additionally, embodiments implementing features related to the digital implementation may include a "thermal servo" mechanism that maintains battery temperature within a specified operating range (e.g., less than 60° C.). In certain embodiments, charging to the battery 110 may be disabled by the thermal servo when battery temperature is above a predetermined temperature threshold (e.g., 45° C.). Features related to the thermal servo will be discussed later at least with respect to FIG. 9.

In certain embodiments, the microcontroller may be configured to sleep when the switch 120 is open, minimizing quiescent power consumption. Further, the microcontroller may be configured to implement features related to line zero crossing detection, switch position detection, robust temperature measurement, primary load current measurement, battery voltage current and voltage measurement, primary load power delivery and dimming, and LED power delivery.

In certain embodiments, the exemplary circuitry illustrated in FIGS. 3-12 may be provided to execute features described herein with respect to the digital implementation using an MCU. While examples discussed with respect to FIGS. 3-12 assume one or more processing units (MCUs) are provided for executing the various processes, it should be appreciated that the present disclosure is not limited to executing the processes described herein using a processing unit such as an MCU. Rather, features described herein may be adapted to be performed on one or more hardware circuits, which may be analog or digital.

Figure 3:
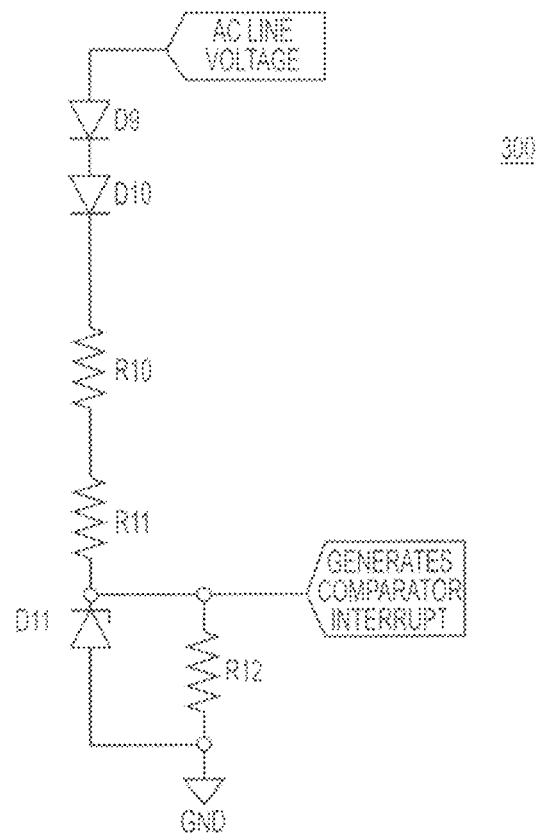
FIGS. 3 and 4 illustrate non-limiting exemplary circuitry for line voltage zero-crossing detection, according to certain embodiments.

FIG. 3 illustrates an exemplary method of line voltage zero-crossing detection, according to certain embodiments. The function of zero-crossing detection circuit 300 is to create a logic-level signal that will trigger interrupts on the MCU, which may synchronize a function of controlling power to a primary load. For example, the output of the circuit 300 may implement a reverse-phase dimming technique for limiting power to the primary bulb 115 when the thermal servo is actuating. The generated logic-level signal may be connected to a comparator on the MCU, whereby a comparator interrupt may be generated when the signal logic-level falls below a certain threshold set by a fixed voltage reference inside the MCU.

The exemplary zero-crossing detection circuit 300 performs the above-described features using two diodes (D9 and D10) to half-wave rectify the line voltage, which then drops across two resistors R10 and R11 into a zener clamp D11 at or near the microcontroller supply voltage. In certain embodiments, a 5.1V zener clamp may be included in the zero-crossing detection circuit 300, but this could be reduced to a value closer to a single Li-ion cell voltage (3V to 4.2V). The limitation of this method is that the interrupt mechanism may be sensitive to zener tolerances.

Figure 4:
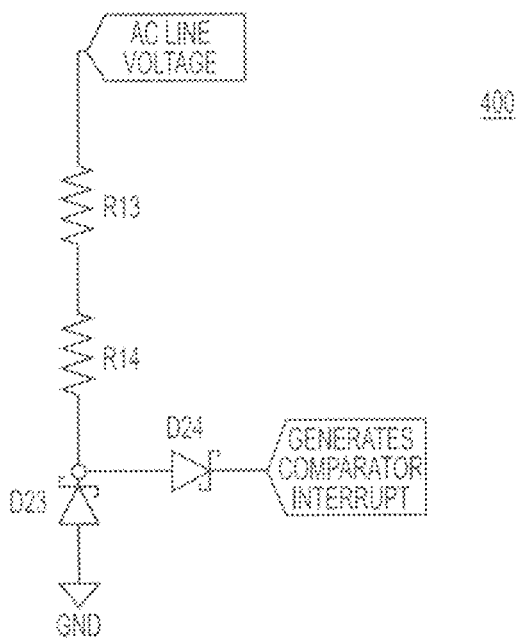

To address the above limitation in the zero-crossing detection circuit 300, a second method may be implemented for zero-crossing detection. As a non-limiting example, FIG. 4 illustrates an exemplary zero-crossing detection circuit 400, which includes a pair of resistors (R13 and R14) and a series-connected Schottkey diode pair (D23 and D24). This method may utilize ESD protection inside the comparator in the MCU to prevent any shorting. In certain embodiments, the series resistor pair (R13 and R14) may be sized so that the current through them is approximately 100 times the bias current in the comparator (e.g., 33 kΩ).

Figure 5:
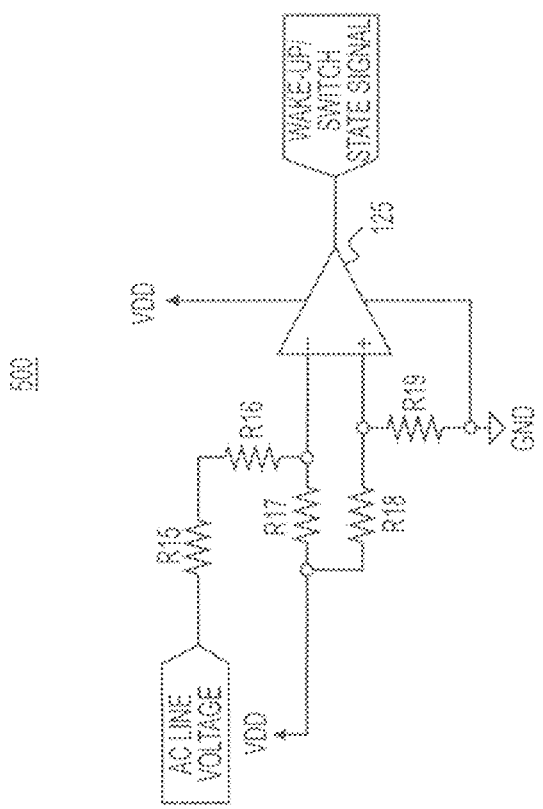
FIG. 5 illustrates exemplary circuitry for switch state detection, according to certain embodiments.

Next, FIG. 5 illustrates exemplary circuitry for switch state detection, according to certain embodiments. The exemplary switch state detection circuit 500 of FIG. 5 is a lean version of the switch state determination circuit 100 described with respect to FIG. 1. FIG. 5 illustrates exemplary MCU connections with the amplifier 125. In this example, the comparator 130 features described above in the analog implementation of FIG. 1 may be performed by the MCU in the digital implementation and therefore, in the case in which an MCP6002 low-power operational amplifier is utilized, the comparator 130 op-amp may be unused (or omitted from the overall circuitry entirely). The switch state detection processing in the switch state detection circuit 500 may be similar to the processes illustrated and described above with respect to FIG. 2, and a repeated description of the switch detection features will not be repeated here. In certain embodiments, the switch state detection circuit 500 may receive a half-wave rectified AC line voltage input (e.g., via a diode and smoothing capacitor connected at the AC line voltage input).

In a digital implementation including a microcontroller, the switch state detection circuit 500 may serve dual purposes. First, the output of the circuit may be connected to the MCU to serve as a wake-up signal (the output is a square wave when AC main line voltage returns to the circuit or just high when the switch 120 is closed and no AC main line voltage is present). Second, the output of the switch state detection circuit 500 may serve as an indication of switch state that is a digital input to the MCU. In certain embodiments, the wake-up signal and the digital input switch state indication may be connected on the same MCU pin. When the switch state indication is received by the MCU from the switch state detection circuit 500, the MCU may perform control features such as those described for FIG. 2 to control power to a load (e.g., the lighting circuit 105).

Figure 6:
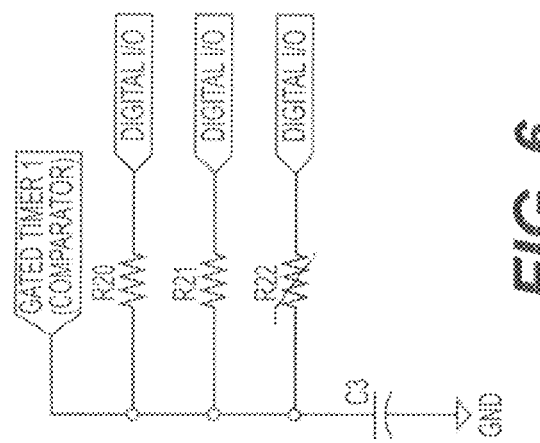
FIG. 6 illustrates exemplary circuitry for temperature measurement, according to certain embodiments.

Next, FIG. 6 illustrates exemplary circuitry for temperature measurement, according to certain embodiments. In the exemplary temperature measurement circuit 600 of FIG. 6, a capacitor C3 is first discharged through resistor R20. The capacitor C3 and the resistor R20 may, e.g., be 0.1 µF and 120Ω, respectively. Then, the capacitor C3 is charged through R22, which may be a 5 kΩ PTC thermistor, and the rise time is measured by the MCU. The capacitor C3 is then discharged through R20 again, and then charged again through R22. The ratio of the charge times is calculated and used by the MCU to compute temperature. A running average or filtered version of these temperature measurements may be stored in a memory accessible to the MCU.

Figure 7:
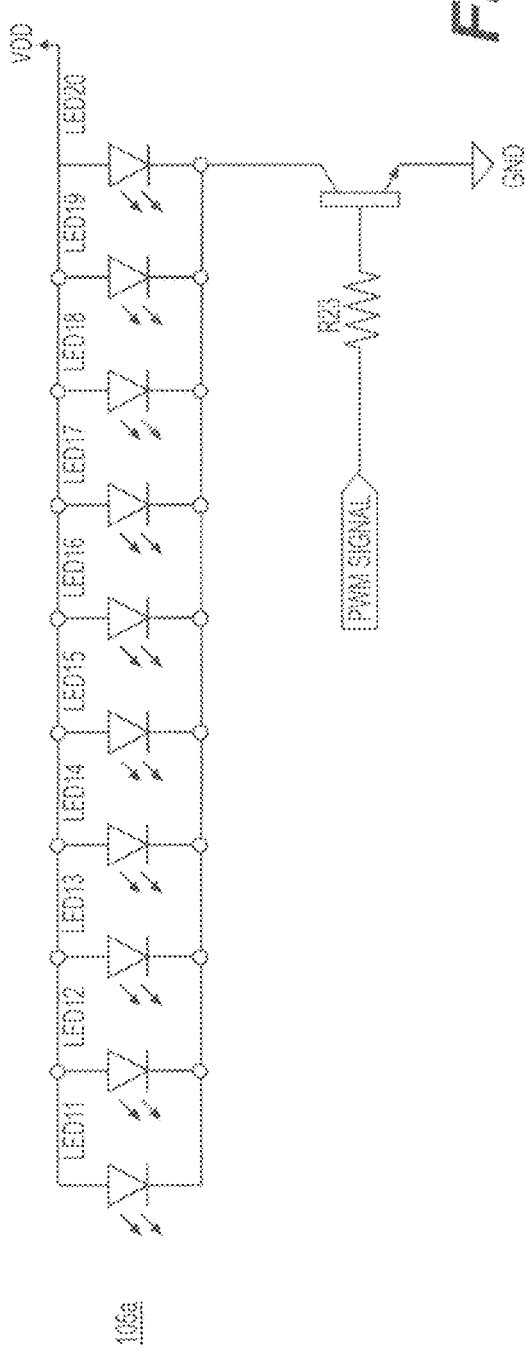
FIGS. 7 and 8 illustrate alternative implementations of LED power delivery, according to certain embodiments.
Figure 8:
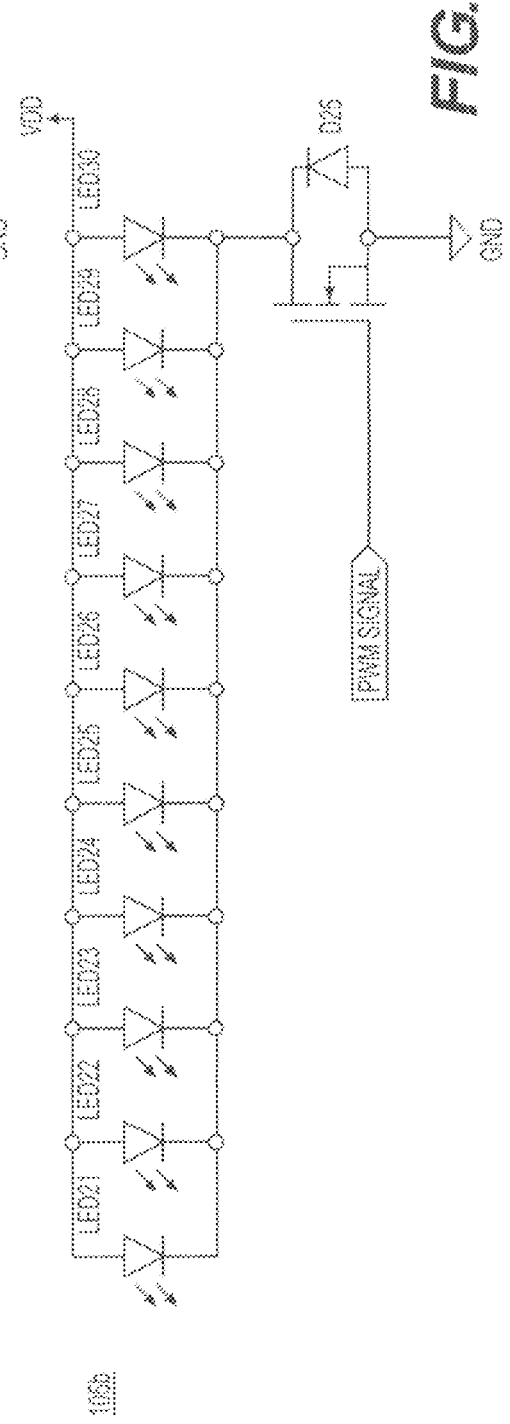

Next, FIGS. 7 and 8 show two alternative implementations of LED power delivery, according to certain embodiments. In these exemplary circuits, LEDs 11 through 30 are pulse-width modulated at 120 Hz with a battery voltage-dependent duty cycle computed during each control loop in order to maintain a predetermined current level through the LEDs. In certain embodiments, the LEDs 11 through 30 are pulse-width modulated to maintain a predetermined average current level through the LEDs. The battery-voltage dependent duty cycle gives the LEDs 11 through 30 a constant, predetermined brightness level, even as battery 110 voltage changes during discharge. The LEDs 11 through 30 may each have an internal series resistor (e.g., 15Ω) that helps to distribute the current among the LEDs. The lighting circuit 105a of FIG. 7 includes a base resistor R23 connected to a BJT for switching power to the LEDs 11 through 20, and the lighting circuit 105b of FIG. 8 includes a MOSFET (to get rid of any dissipation in the base resistor and to save on component cost) that is shunted by a transient-voltage suppression (TVS) diode D25 for ESD protection.

Figure 9:
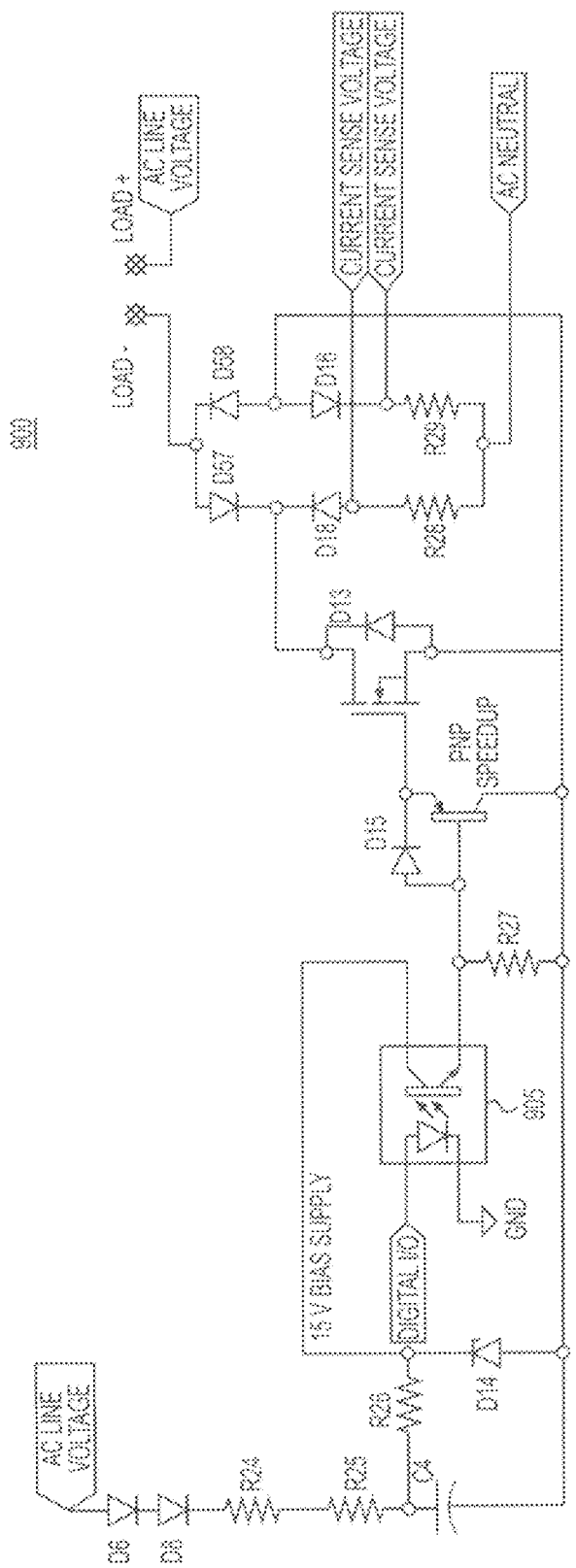
FIG. 9 illustrates an exemplary circuit for temperature control, current sensing, compatible device detection, and load soft-starting, according to certain embodiments.

Next, FIG. 9 illustrates an exemplary circuit for temperature control, current sensing, compatible device detection, and load soft-starting, according to certain embodiments. In select implementations, the circuitry of FIG. 9 may be configured to deliver power to the primary bulb 115, or to another device ("primary load" for the purposes of this example). The exemplary circuit 900 of FIG. 9 functions as a ground-referenced bi-directional switch that implements a dimming technique (e.g., reverse-phase dimming). A bias supply (e.g., 15V bias supply) is created using a zener clamp that ties to the drain of an optoisolated transistor 905. The optoisolated transistor 905 switches a low-threshold high voltage MOSFET (shunted by a TVS diode for ESD protection) that delivers power to the primary load (e.g., primary bulb 115) through a full-bridge rectifier. Current sense resistors R28 and R29 (e.g., 0.1 kΩ each) are placed on each of the current paths to measure current during both positive and negative portions of the sinusoidal line voltage cycle. This achieves fast switch speeds (no slow turn on or turn off times as seen with darlington pairs), low-cost, low power dissipation (no transistor base resistor because a MOSFET is used), reduced heat dissipation, and isolation. The isolation features in the circuit 900 block a return path for current that does not go through the primary load.

Referring to FIG. 9, in certain embodiments, a signal including the battery 110 temperature is received by the MCU. Based on the battery temperature, the MCU generates a PWM signal that is output to the circuit 900. The PWM signal is received at the optoisolated transistor 905 in FIG. 9. Accordingly, the circuit 900 may control power to the primary load at a given duty cycle that is based on the battery 110 temperature. For example, the circuit 900 may dim the primary load (in the case of a light bulb) when the battery 110 temperature reaches a predetermined threshold. In an implementation in which the battery 110 is included in a lighting device, the heat generated by a light bulb contributes to heating the battery. Therefore, by controlling the output of the primary load based on battery temperature, the temperature of the battery may be regulated such that it remains within a prescribed operating range. In certain embodiments, rather than directly controlling the output of the primary load to regulate the battery 110 temperature, the circuit may control another cooling device (e.g., a fan) based on the measured battery temperature.

In certain embodiments, the average current through the current sense resistors R28 and R29 may be determined. Based on the average current through the current sense resistors R28 and R29, the MCU may determine the current to the primary load (e.g., primary bulb 115), which may be used to determine when an incompatible load is connected. In certain embodiments, when the measured average current through the current sense resistors R28 and R29 is above a predetermined threshold value, the MCU may determine that an incompatible load is present on the local circuit and a fault indication may be generated. For example, when an incandescent light bulb is used as the primary load, a current above the predetermined threshold may be measured through the current sense resistors R28 and R29, which may cause the MCU to enter a fault state.

Moreover, in certain embodiments, the current sense resistors R28 and R29 may enable soft-starting the primary load. As a non-limiting example of soft-start features that may be performed by the circuit 900, the MCU may control circuitry within the circuit 900 such that voltage to the primary load is slowly ramped up. As the voltage to the primary load increases, the average current through the current sense resistors R28 and R29 may be determined. In certain embodiments, the average current is determined at a predetermined frequency, which may correspond to step increases in the primary load voltage. If the average current through the current sense resistors R28 and R29 is above a predetermined threshold, a fault may be generated. In any case, the ramping of the voltage to the primary load prevents a large surge of current from flowing through the primary bulb 115, which improves the longevity of the primary load.

Figure 10:
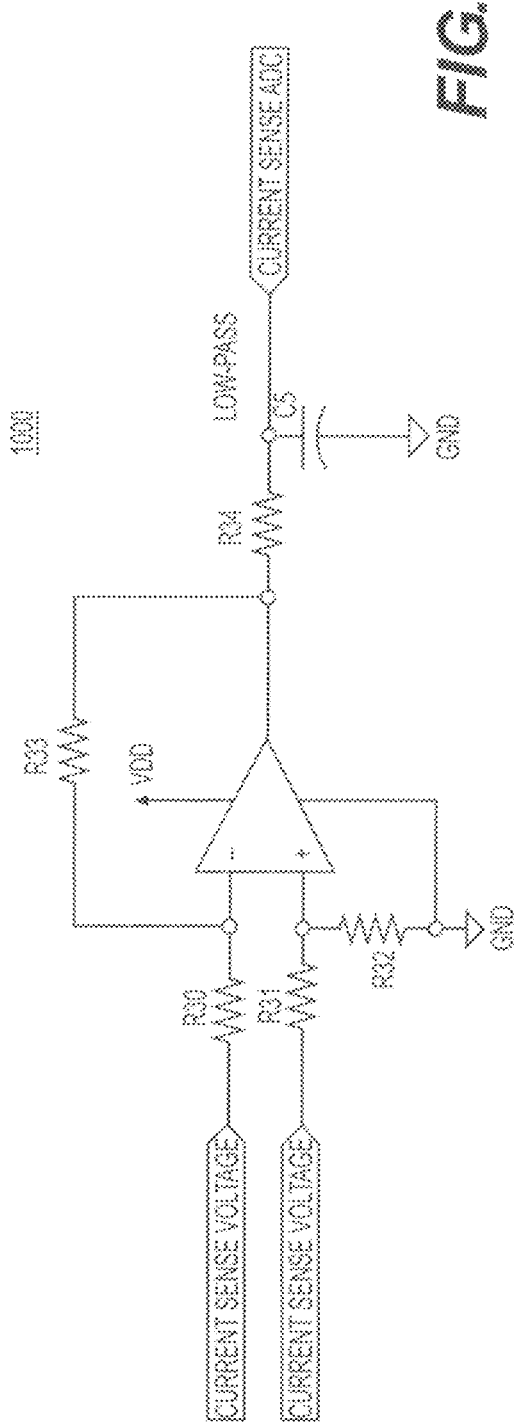
FIGS. 10 and 11 illustrate non-limiting exemplary circuitry for current detection, according to certain embodiments.
Figure 11:
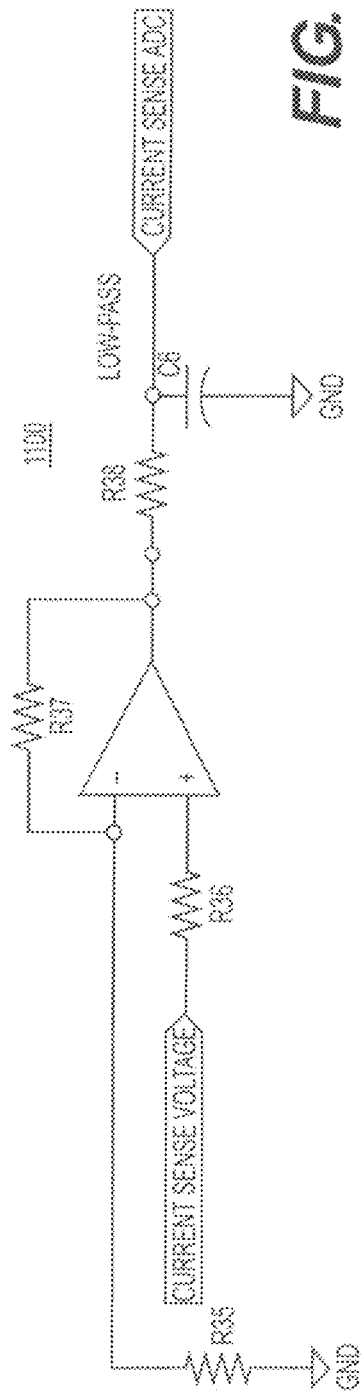

Next, FIGS. 10 and 11 illustrate non-limiting exemplary circuitry for current detection, according to certain embodiments.

In particular, FIG. 10 illustrates an exemplary current sense circuit 1000 for detecting current at a primary load (e.g., the primary bulb), and FIG. 11 illustrates a current sense circuit 1100 for detecting a current at the battery 110. The exemplary current sense circuit 1000 is configured as a differential amplifier that averages the current from the positive and negative cycles that appear in the reverse-phase dimming mechanism. In certain embodiments, the gain of the amplifiers in the current sense circuits 1000 and 1100 is fixed at 5 because the A/D compares to a 1.024V fixed voltage reference, and 2 amps through a 0.1Ω current sense resistor gives 0.2V. Thus, if this signal is given a gain of five, then 2 amps will be the maximum current reading. In certain embodiments, a 5 Hz low-pass filter may also be added on the output of the current sense circuits 1000 and 1100.

Figure 12:
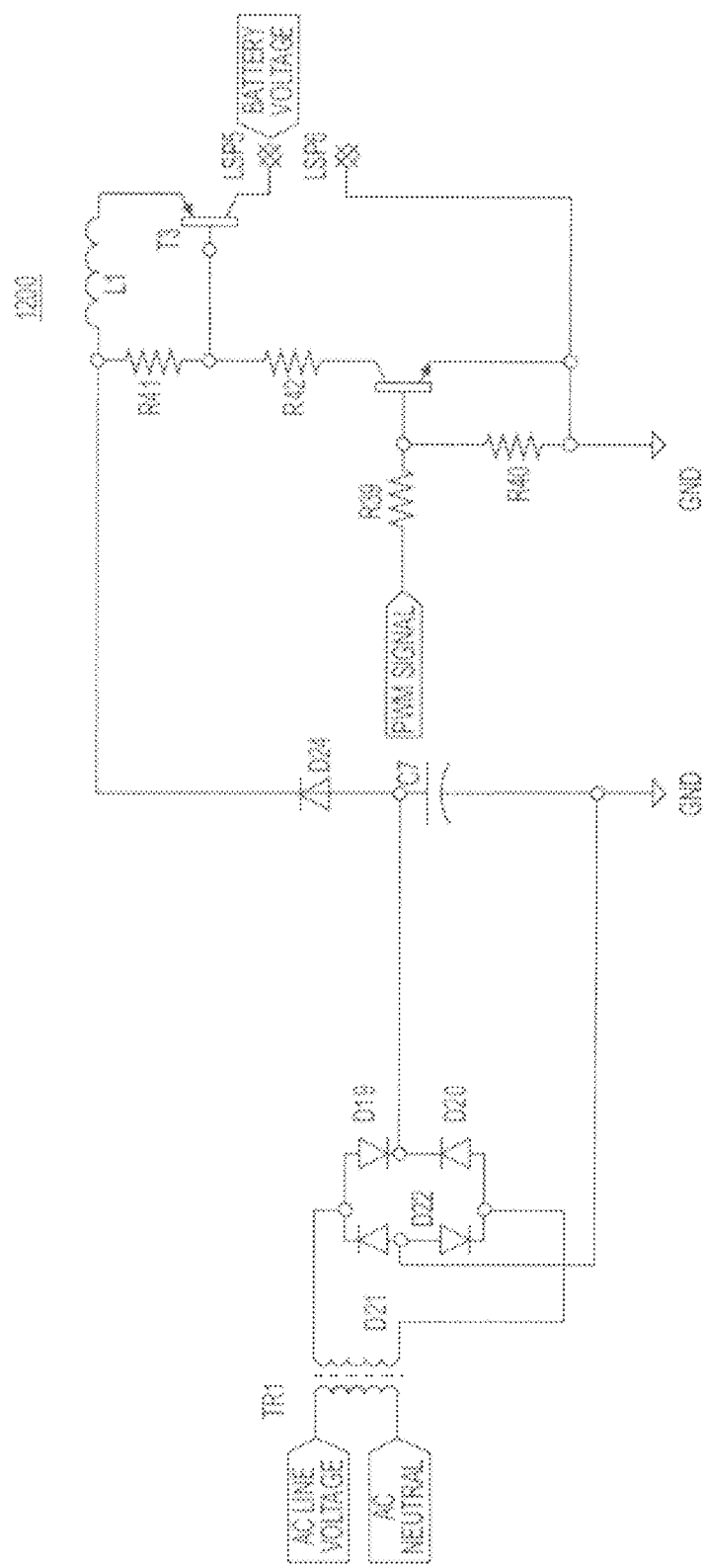
FIG. 12 illustrates non-limiting exemplary battery charging circuitry, according to certain embodiments.

Next, FIG. 12 illustrates non-limiting exemplary battery charging circuitry, according to certain embodiments. In the exemplary battery charging circuit 1200 of FIG. 12, the MCU pulse-width modulates an NPN transistor (e.g., at 100 kHz), which drives a PNP transistor that switches the output of a buck converter. In certain embodiments, the input to the buck converter may be a 5.5 VDC voltage created by a rectifier and step-down transformer. The buck converter may be sized to provide a +/−50 mA current ripple, which is 10% of the fast charge rate, according to certain embodiments.

Figure 13A:
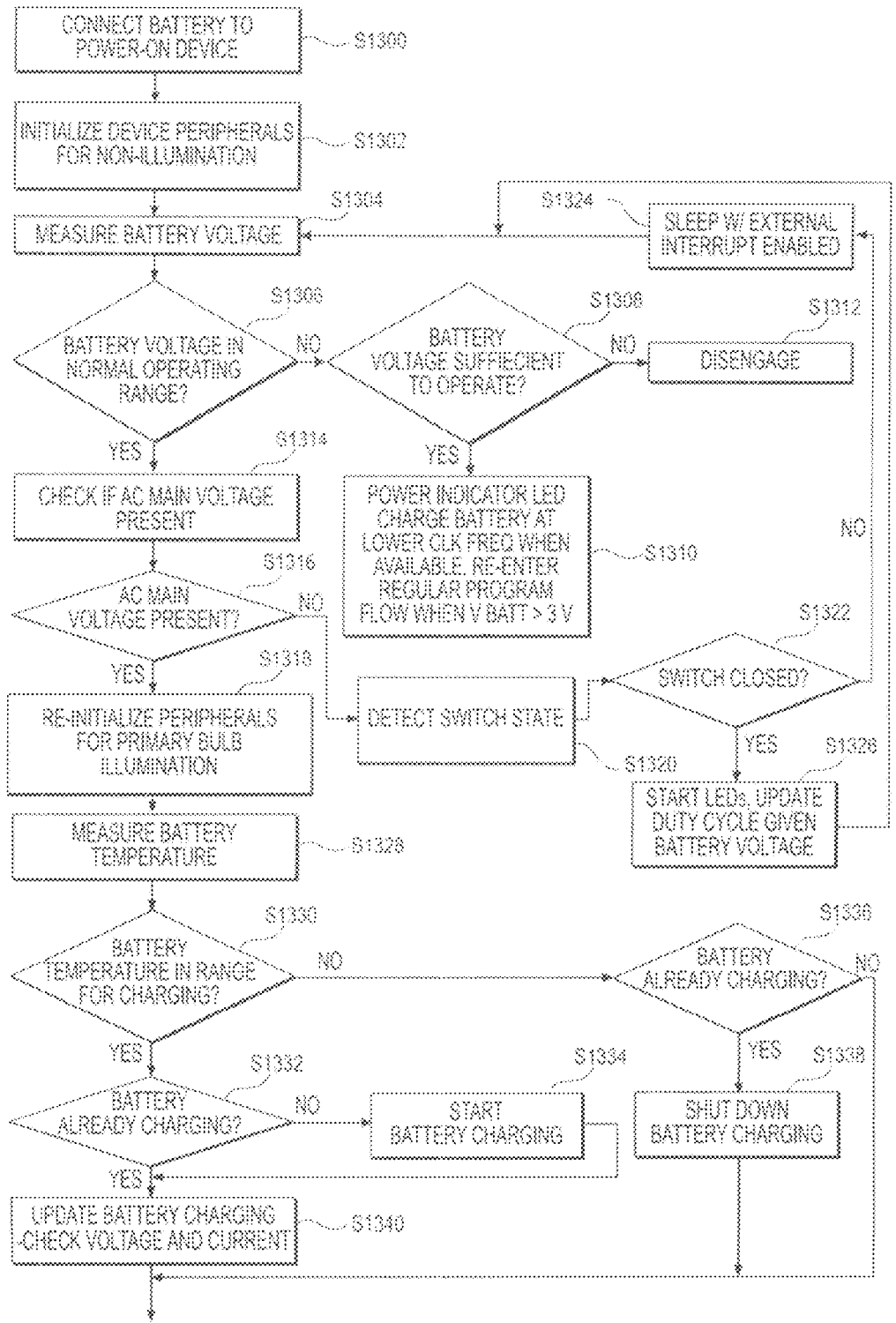
FIGS. 13A and 13B illustrate a non-limiting exemplary flowchart for backup load power control and battery charging control, according to certain embodiments.
Figure 13B:
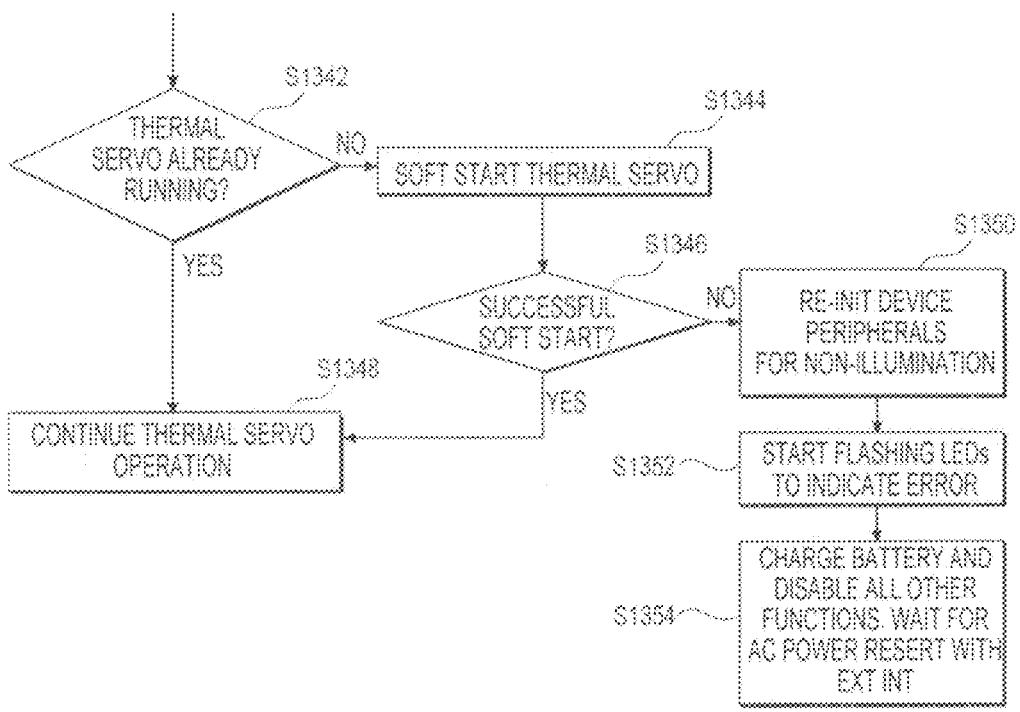

Next, FIGS. 13A and 13B illustrate a non-limiting exemplary flowchart for backup load power control and battery charging control, according to certain embodiments. For simplicity, the exemplary processes are discussed with reference to a backup power device that may include circuitry and one or more processing units (MCUs) configured to perform features described in the present disclosure. However, it should be appreciated that the exemplary processes in FIGS. 13A and 13B may be adapted to be performed in other devices and as stand-alone circuits.

Referring first to FIG. 13A, the process begins at step S1300, where power from the battery 110 is supplied to power-on the backup power device.

At step S1302, the MCU initializes the backup power device peripherals for non-illumination. In certain embodiments, the clock signal used at step S1302 may be 62.5 kHz.

At step S1302, the voltage of the battery 110 is measured and the MCU determines whether the measured voltage is within the range for normal operation (e.g., >3V) at step S1306. If the battery voltage is less than the normal operating range, it is determined at step S1308 whether the battery voltage is sufficient for the backup power device to operate (e.g., >1.8V). If the voltage is insufficient, the process ends at step S1312.

Otherwise, if the voltage of the battery 110 is determined to be within the range for normal operation at step S1306, the MCU at step S1314 reads a digital input corresponding to the AC main voltage, and it is determined whether normal AC line voltage is present (i.e., whether a power failure occurred).

If AC line voltage is determined to be present at step S1316, the MCU at step S1320 reads a digital input for switch state detection in order to determine whether the switch 120 is open or closed. Aspects of generating a switch state detection signal were discussed previously and therefore, a repeated discussion of switch state detection features according to the present disclosure will not be presented here.

If the switch 120 is determined to be open at step S1322, the MCU enters a sleep state and an external interrupt is enabled. Otherwise, if the switch 120 is determined to be closed at step S1322, the LEDs in the lighting circuit 105 are illuminated. In certain embodiments, the LEDs in the lighting circuit 105 are pulse-width modulated at 120 Hz with a battery voltage-dependent duty cycle computed during each control loop in order to maintain a predetermined average current level through the LEDs, which ensures the LEDs are maintained at a constant, predetermined brightness level, even as battery 110 voltage changes during discharge. Following the illumination of the lighting circuit 105, the process returns to step S1304.

Referring back to step S1316, if AC line voltage is determined to be present at step S1316, the MCU at step S1318 re-initializes the backup power device peripherals for illumination of the primary bulb 115. In certain embodiments, the clock signal at step S1318 is 16 MHz.

Following the re-initialization at step S1318, the temperature of the battery 110 is measured at step S1328. In certain embodiments, circuitry such as the temperature measurement circuit 600 of FIG. 6 may be utilized for measuring the battery 110 temperature at step S1328.

At step S1330, the MCU at step S1330 determines whether the measured battery temperature is within a predetermined range for charging. The predetermined temperature range for charging the battery 110 may be selected on the type of battery utilized for providing backup power in the backup power device. In certain embodiments in which the battery 110 is a Li-ion battery, the predetermined range for charging may be less than 40° C. However, one of ordinary skill will appreciate that the temperature range may vary according to battery type and therefore, an appropriate temperature range should be selected to ensure battery temperature is maintained sufficiently below the safe operating temperature of the selected battery.

If the temperature of the battery 110 is determined to be above the predetermined range for charging at step S1330, the MCU determines at step S1336 whether the battery 110 is presently charging. If the battery 110 is determined to be charging at step S1336, the MCU controls the battery charging circuitry such that charging of the battery 110 is stopped.

Otherwise, if the temperature of the battery 110 is determined to be below the predetermined range for charging at step S1330, the MCU at step S1332 determines if the battery 110 is presently charging. If the battery 110 is not charging, the MCU at step S1334 controls the battery charging circuitry such that charging commences. Exemplary circuitry for implementing the charging function at step S1334 may be the battery charging circuit 1200 of FIG. 12.

At step S1340, the charging state of the battery (e.g., voltage and current conditions during the charge) is determined and updated based on the determined charging conditions. Exemplary circuitry for measuring charging conditions of the battery 110 may include the current sense circuit 1100.

At step S1342, the MCU determines whether a thermo servo included in the backup power device circuitry is currently running. As discussed previously, in certain embodiments, power switching devices according to aspects of the present disclosure may include one or more thermal servos for controlling battery temperature. The thermal servo may be configured to reduce power in a load (e.g., via a dimming technique) in order to keep the temperature of the battery 110 below a predetermined threshold. For example, certain Li-ion batteries have a safe operating temperature of limit of 60° C., in which case the thermal servo feature according to the present disclosure may maintain the battery temperature below this limit by controlling power to heat dissipating loads such as light bulbs. In certain embodiments, the thermal servo may be configured to soft start a load and to detect an incompatible load that does not comply with the previously discussed assumptions (e.g., CFL and LED bulbs and other electrical devices having circuit elements that cause the loads to appear as substantially open circuits to the test signal).

If the thermal servo is detected to be running at step S1342, the thermal servo continues normal operation at step S1348. Otherwise, the MCU at step S1344 controls circuitry related to the thermal servo such that the thermal servo is soft-started. If the soft start is successful (S1346), the process moves to step S1348. If the soft start is unsuccessful at step S1346, the MCU at step S1350 re-initializes peripherals for non-illumination of the primary bulb 115. In certain embodiments, a clock signal of 62.5 kHz may be used at step S1350.

At step S1352, the MCU may control power to the LEDs in the lighting circuit 105 (or other indicating lights) such that an error is indicated. For example, the LEDs may be controlled to flash.

At step S1354, the battery 110 is charged, and all other functions of the backup power device are disabled. In certain embodiments, the MCU may wait for an AC power reset signal.

Figure 14:
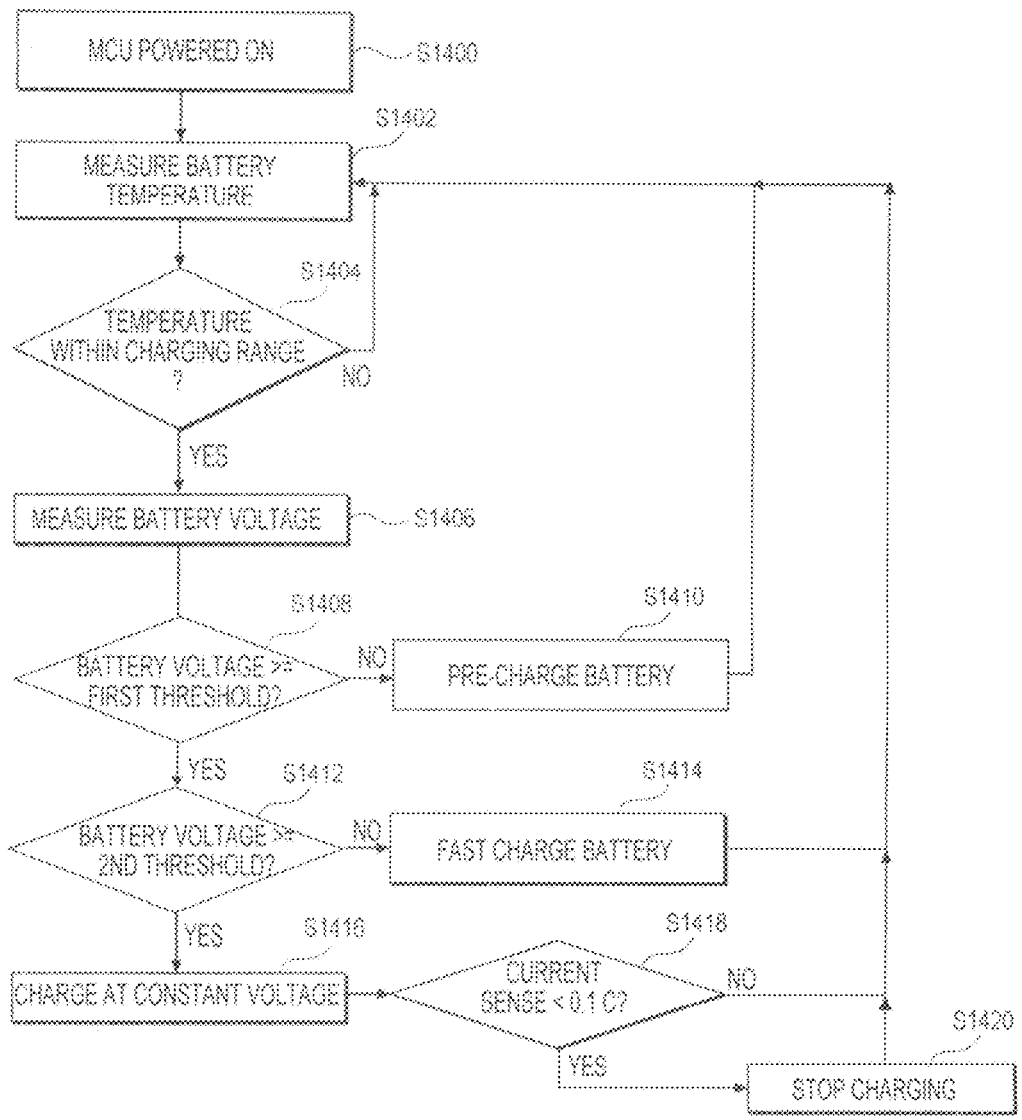
FIG. 14 illustrates a non-limiting exemplary flowchart for controlling battery charging, according to certain embodiments.

Next, FIG. 14 illustrates a non-limiting exemplary flowchart for controlling battery charging, according to certain embodiments.

The process of FIG. 14 starts at step S1400, where the MCU is powered on. In certain embodiments, the MCU powers on at 1.8V at step S1400.

At step S1402, the temperature of the battery 110 is measured by the MCU. In certain embodiments, the MCU may measure the temperature of the battery 110 using the exemplary temperature measurement circuit 600 of FIG. 6.

At step S1404, the MCU determines whether the measured battery temperature is within a predetermined temperature range for charging. In certain embodiments, the MCU may determine at step S1404 whether the temperature of the battery 110 is less than 45° C. If the temperature of the battery 110 is outside the predetermined temperature range at step S1404, the MCU continues measuring the temperature of the battery 110.

Otherwise, if the temperature of the battery 110 is within the predetermined range at step S1404, the MCU at step S1406 measures the voltage of the battery 110.

At step S1408, the MCU compares the measured voltage of the battery 110 to a first threshold voltage (e.g., 2.5V). If the measured voltage of the battery 110 is below the first threshold value at step S1408, the battery 110 is charged using a pre-charge operation at step S1410. In certain embodiments, the battery 110 may be charged in the pre-charge operation at a C-rate of 0.1 C (for 500 mAh, this is 50 mA). In certain embodiments, the exemplary battery charging circuit 1200 of FIG. 12 is used to perform the pre-charge operation at step S1408.

If the voltage of the battery 110 is greater than the first threshold value at step S1408, the MCU at step S1412 determines whether the voltage of the battery 110 is above a second threshold value (e.g., 4.2V). If the voltage of the battery 110 is less than the second threshold value at step S1412, the battery 110 is charged using a fast charge operation at step S1414. In certain embodiments, the battery 110 may be charged in the fast charge operation at a C-rate of 1.0 C (for 500 mAh, this is 500 mA). In certain embodiments, the exemplary battery charging circuit 1200 of FIG. 12 is used to perform the fast charge operation at step S1414.

Otherwise, if the voltage of the battery 110 is greater than the second threshold at step S1412, the battery 110 at step S1416 is charged at a constant voltage corresponding to the second threshold value (4.2V). In certain embodiments, the exemplary battery charging circuit 1200 of FIG. 12 is used to perform the charge operation at step S1416.

At step S1418, the MCU determines the current of the battery 110. In certain embodiments, the exemplary current sense circuit 1100 of FIG. 11 may be used to measure the current of the battery 110 at step S1418. If the measured current results in a C-rate of less than 0.1 C (or another arbitrary value), charging is stopped at step S1420 and the process returns to step S1402. Otherwise, charging continues and the process returns to step S1402.

Next, in certain embodiments, the circuitry illustrated and described in the present disclosure may be fitted into a lighting device. As a non-limiting example, FIG. 15 illustrates an exemplary lighting device for performing switch state detection and electrical power control features in accordance with aspects of the present disclosure.

Figure 15:
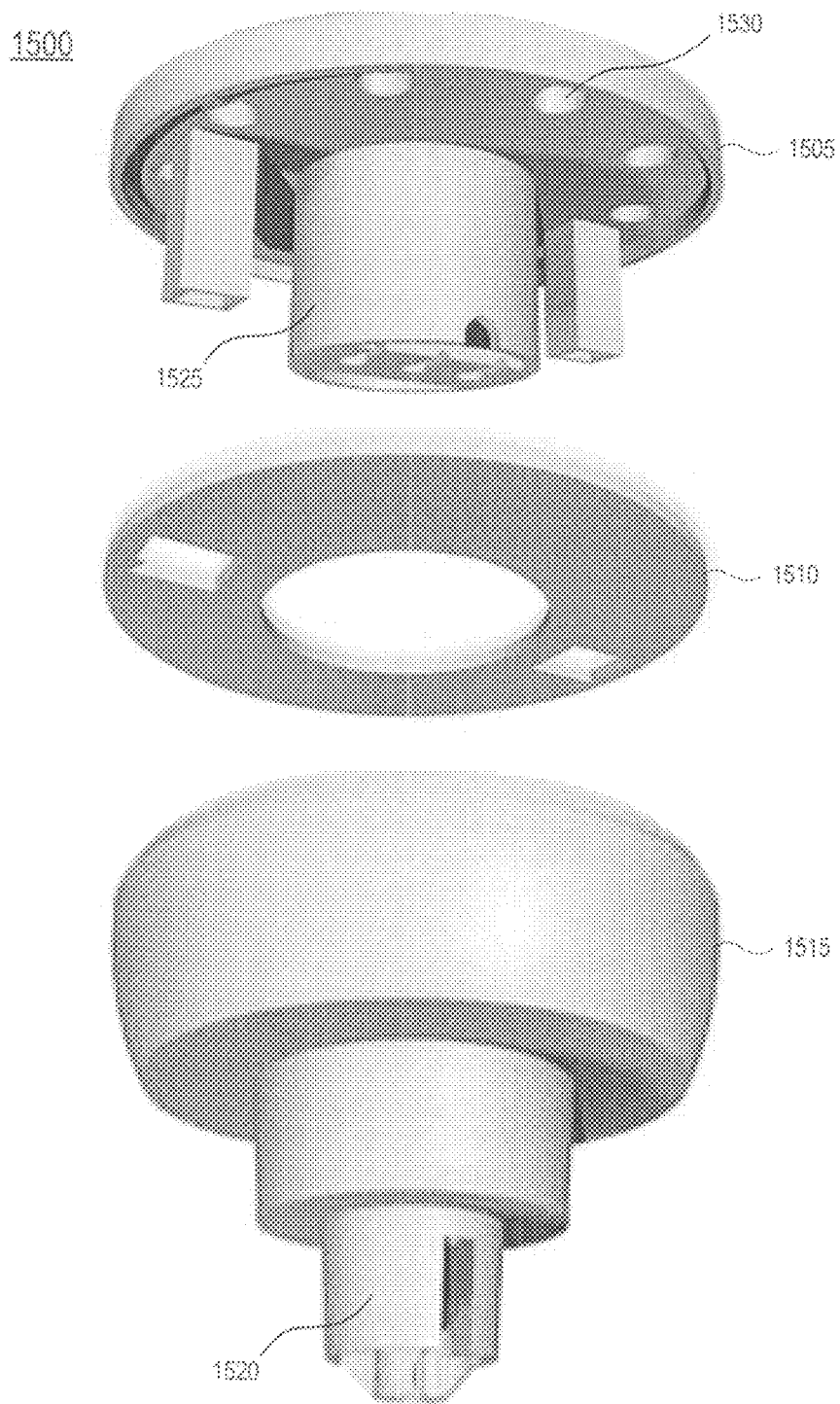
FIG. 15 illustrates an exemplary lighting device for detecting a switch state and controlling electrical power, according to certain embodiments.

Referring to FIG. 15, FIG. 15 illustrates an exemplary lighting device 1500, which may include a top casing 1505, a circuit board 1510, and a base portion 1515. In certain embodiments, the lighting device 1500 may include a socket connection 1520 configured to be screwed into a light fixture. Further, the top casing 1505 may include a socket interface, which may be configured to accept a CFL or LED light bulb that serves as the primary bulb 115 in the switch state detection circuit 100. In this case, the primary bulb 115 may be housed in the socket interface 1525 (i.e., inserted in a top opening of the top casing 1505 such that it is securely mounted in the socket interface 1525), and AC main input voltage may be received at the socket connection 1520 in order to power the primary bulb 115 via an electrical connection between the socket connection 1520 and the socket interface 1525. Further, the test signal generated by the switch state detection circuit 100 may by output to the AC mains by transmitting the test signal to the socket connection 1520 via the socket interface 1525.

In certain embodiments, the lighting device 1500 may illuminate the backup lights if the primary light fails (or is missing) when it is not in power failure as a safety feature.

The circuit board 1510 may include the switch state detection circuit 100, as well as other related circuitry. For example, various circuitry elements described herein may be surface-mounted on the circuit board 1510. Additionally, the LEDs 1 through 10 of the lighting circuit 105 may be mounted on the circuit board 1510. The circuit board 1510 may be housed within the base portion 1515 such that the various circuit elements are protected from the external environment. The top casing 1505 may function to enclose the circuit board 1510 within the base portion 1515 when the lighting device 1500 is assembled. Further, the top casing 1505 may include a plurality of holes 1530 spaced at a distance corresponding to the spacing of the LEDs 1 through 10 on the circuit board 1510. Accordingly, when the elements shown in FIG. 15 are fitted together to form the complete lighting device 1500, the LEDs 1 through 10 may provide external illumination in a power failure situation via the holes 1530.

One of ordinary skill will easily appreciate that aspects of the present disclosure may be adapted to be implemented in other electrical devices aside from the exemplary lighting device illustrated in FIG. 15. Further, with respect to lighting applications, the present disclosure may be adapted such that elements described herein are embodied within one or more light bulbs, within one or more light fixtures, within one or more sockets, within one or more switching devices or a combination thereof. For example, a light bulb such as the lighting device 1500 may include circuitry and associated processing elements enclosed in a single housing such that the lighting device 1500 may execute the processes described herein by simply being installed in a household light fixture. The circuitry may illuminate some or all of its LEDs as primary lighting and some or all of its LEDs as backup lighting (at various levels of dimming). Alternatively, a light fixture may be adapted to include any of the circuitry and processing elements described herein such that the features described in the present disclosure may be executed simply by installing a conventional LED or CFL light bulb into the fixture. Similarly, a switching device may be adapted to include all the circuitry and processing elements described herein. Moreover, the elements and processes described herein may be distributed across multiple devices connected on a local circuit. The benefits of implementing switch state detection and backup power control features of the present disclosure in a larger device such as a light fixture include the ability to provide a larger battery, which can enable providing more backup power for longer time periods. Additionally, the benefits of implementing the features of the present disclosure in a larger device and in separate components include providing improved heat management capability due to the increased space between components.

Figure 16:
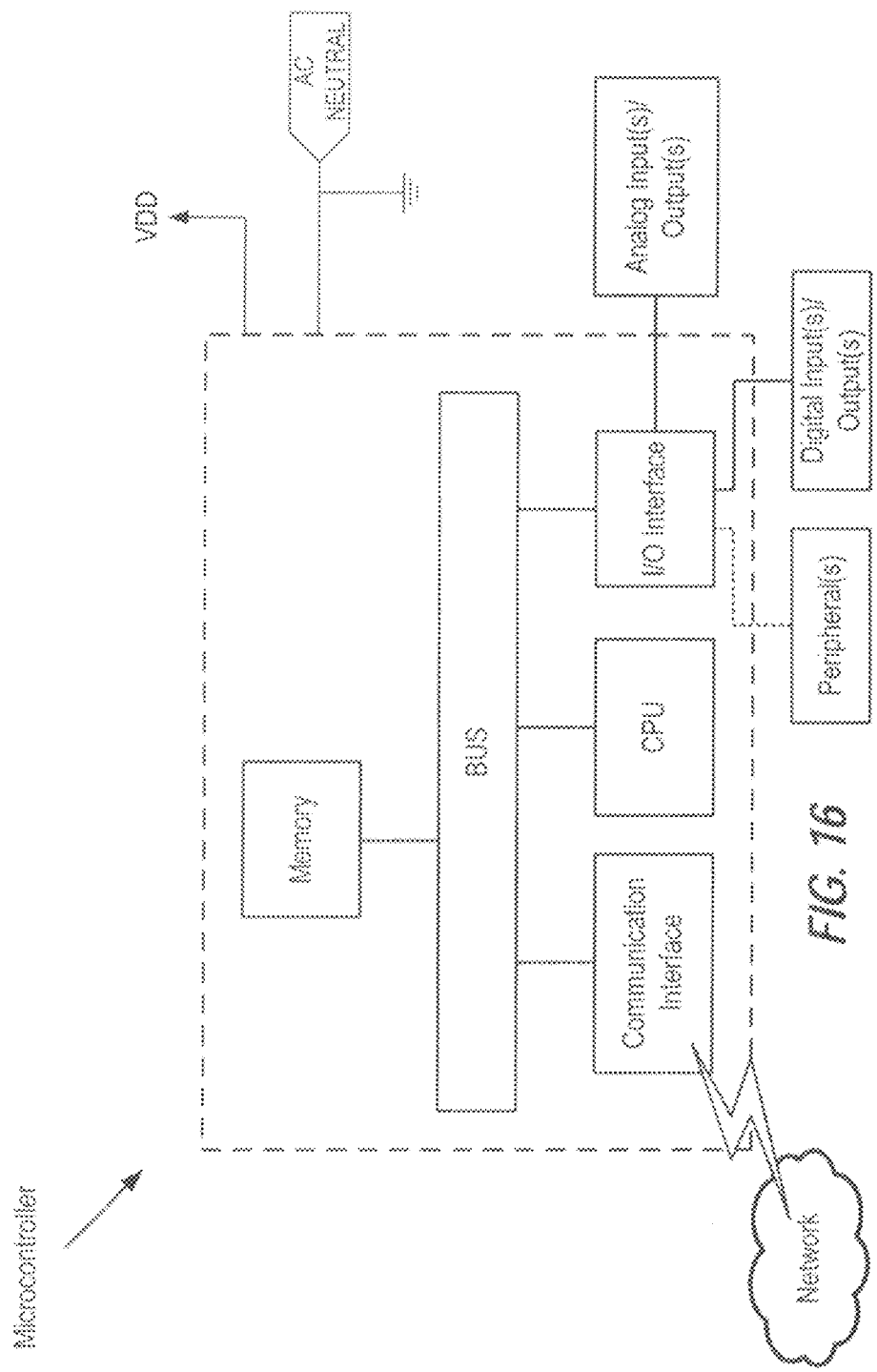
FIG. 16 is a schematic illustration of a microcontroller, according to certain embodiments.

FIG. 16 illustrates a non-limiting exemplary microcontroller that may be included in circuitry described herein to perform processing and control features discussed throughout the present disclosure. The microcontroller of FIG. 16 can be embodied, in an exemplary implantation, by a computer system of conventional hardware architecture that has been modified by programming to execute the algorithms described herein. In another implementation, the microcontroller of FIG. 16 may be embodied in a lighting device that includes lighting circuitry. In another implementation, the microcontroller of FIG. 16 may be embodied in a switching device that includes switching circuitry and other circuitry related to switch state detection. In another implementation, the microcontroller of FIG. 16 may be embodied as stand-alone circuitry that may be adapted to interface with other circuit elements, such as the various circuitry and lighting elements described herein. In certain embodiments, the microcontroller of FIG. 16 may include a neutral from the AC mains connected at the ground of the microcontroller. Further, positive power rail VDD may provide power to the microcontroller.

In FIG. 16, the microcontroller includes a CPU which may perform the processes described herein. The CPU may, e.g., be a Xenon or Core processor from Intel of America or an Opteron processor from AMID of America, or may be other processor types that would be recognized by one of ordinary skill in the art. Alternatively, the CPU may be implemented on an FPGA, ASIC, PLD or using discrete logic circuits, as one of ordinary skill in the art would recognize. Further, the CPU may be implemented as multiple processors cooperatively working in parallel to perform the instructions of the processes described in the present disclosure. Data may be transmitted to and from the various elements of the microprocessor via a communication bus.

The process data and instructions may be stored in a memory. These processes and instructions may also be stored on a storage medium disk such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the microcontroller communicates, such as a server or computer.

Additionally, an I/O (input/output) interface is provided for inputting analog and digital signals generated by processes described herein. Further, the microprocessor may receive control signals and/or data from external circuitry (e.g., lighting or switching circuits) which can be connected to the I/O interface as a peripheral.

The microcontroller of FIG. 16 includes a communication interface for interfacing with a network. As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G and 4G wireless cellular systems. The wireless network can also be Wi-Fi, Bluetooth, or any other wireless form of communication that is known. In certain implementations, power-line communication (PLC) over the electrical mains may be utilized for communication to and from the microcontroller. In certain implementations, the communications interface may communicate with other lighting or switching circuitry, enabling multiple lighting or switching to communicate with each other. For example, in one mode of operation, one lighting circuit could signal to the other local lighting circuits to remain in a non-illuminated state while providing the only source of illumination during power failure until lighting circuit battery's state of charge falls below a threshold value. Once the state of charge reaches the threshold value, the lighting circuit could signal another lighting circuit to take over illumination. The communications could be used for any type of coordinated action.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. For example, the exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

Further, the functions, processes and algorithms described herein may be performed in hardware or software executed by hardware, including computer processors and programmable processing circuits configured to execute program code and computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses, inter alia, the embodiments noted below.

(1) A device comprising: a main power connection that receives power from a main power source under normal conditions; and circuitry configured to determine, based on an input from the main power connection, when the power from the main power source is absent; output, when the main power source is absent, a test signal at the main power connection; and generate a switch state detection signal based on current flow generated as a result of the output of the test signal, wherein the switch state detection signal indicates a position of a switch that connects the main power connection to the main power source, the circuitry is configured to generate the switch state detection signal to indicate the switch is closed when the current flow is above a threshold, and the circuitry is configured such that when the power from the main power source is absent, the switch is closed, and a plurality of devices are connected on the supply side of the switch, the plurality of devices on the supply side of the circuit appear as a substantially open circuit to the test signal.

(2) The device of (1), wherein the test signal is set at a level such that, when the power from the main power source is absent and the switch is closed, the plurality of devices on the demand side of the switch appear as the substantially open circuit to the test signal, and a plurality of devices on the supply side of the switch appear as a substantially closed circuit to the test signal.

(3) The device of (1) or (2), wherein the test signal is set at a direct current (DC) voltage of less than 3V.

(4) The device of any one of (1) to (3), wherein the circuitry is configured to determine when an incompatible load is connected on a local circuit that includes the switch state detection device.

(5) The device of any one of (1) to (4), wherein the circuitry is configured to output a fault signal in response to detecting the incompatible load.

(6) The device of any one of (1) to (5), wherein the circuitry is configured to determine when the incompatible load is connected to the local circuit based on a measurement of current flow from the main power connection.

(7) The device of any one of (1) to (6), further comprising one or more diodes connected between the main power connection and the circuitry, wherein a voltage drop across the one or more diodes is set based on the test signal.

(8) A method of detecting a position of a switch during a failure of a main power source, the method comprising: determining, by circuitry connected to the switch, when power from the main power source is absent; outputting, by the circuitry, when the main power is absent, a test signal from a main power connection to the main power source; and generating, by the circuitry, a switch state detection signal based on current flow generated as a result of the output of the test signal, wherein the generated switch state detection signal indicates the switch is closed when the current flow is greater than a predetermined threshold.

(9) A device comprising: a main power connection that receives power from a main power source under normal conditions; a battery; a lighting circuit including a plurality of lights, wherein the lighting circuit is configured to be powered by the main power source when power from the main power source is available and to be powered from the battery when power from the main power source is absent and a switch that connects the main power connection with the lighting circuit is closed; and circuitry configured to determine, based on an input from the switch, when the power from the main power source is absent; output, when the main power source is absent, a test signal at the main power connection; generate a switch state detection signal based on current flow generated as a result of the output of the test signal; and control power provided by the battery to the lighting circuit based on the switch state detection signal and the determination of whether power from the main power source is absent, wherein the circuitry is configured to generate the switch state detection signal to indicate the switch is closed when the current flow is above a predetermined threshold, and the circuitry is configured to illuminate at least one of the lights when the power from the main power source is absent and the switch state detection signal indicates the switch is closed.

(10) The device of (9), wherein the test signal is set at a level such that, when the power from the main power source is absent and the switch is closed, a plurality of devices on the demand side of the switch appear as substantially open circuit to the test signal, and a combination of devices on the supply side of the switch appear as a substantially closed circuit to the test signal.

(11) The device of (9) or (10), wherein the plurality of lights are one or more of a light emitting diode (LED) or a compact fluorescent light (CFL) bulb.

(12) The device of any one of (9) to (11), wherein the circuitry is configured to determine when an incompatible load is connected on a local circuit that includes the light bulb.

(13) The device of any one of (9) to (12), wherein the circuitry is configured to output a fault signal in response to detecting the incompatible load.

(14) The device of any one of (9) to (13), wherein the circuitry is configured to determine when the incompatible load is connected to the local circuit based on a measurement of current flow from the main power connection.

(15) The device of any one of (9) to (14), further comprising one or more diodes connected between the main power connection and the circuitry, wherein a voltage drop across the one or more diodes is set based on the test signal.

(16) The device of any one of (9) to (15), wherein: the circuitry is configured to measure a temperature of the battery, and the circuitry is configured to control, when the main power source is available and the switch is closed, power to the lighting circuit based on the measured battery temperature.

(17) The device of any one of (9) to (16), wherein the circuitry includes a thermal servo that reduces power to the lighting circuit in order to keep the temperature of the battery below a predetermined threshold.

(18) The device of any one of (9) to (17), wherein the circuitry includes a ground-referenced bi-directional switch that implements a dimming technique to keep the temperature of the battery below the predetermined threshold.

(19) The device of any one of (9) to (18), wherein the circuitry is configured to determine the battery voltage and to generate, based on the battery voltage, a control signal that maintains the light bulb at a constant brightness when the battery voltage changes.

(20) The device of any one of (9) to (19), wherein the circuitry generates the control signal with a battery-voltage dependent duty cycle such that the plurality of lights are pulse-width modulated to maintain a predetermined average current level through the plurality of lights.

(21) The device of any one of (9) to (20), wherein: the circuitry is configured to measure a temperature of the battery, and the circuitry is configured to control a charging operation of the battery based on the measured battery temperature.

(22) The device of any one of (9) to (21), wherein the lighting circuit is configured such that the plurality of lights may be fully powered, partially powered, or powered in part.

(23) The device of any one of (9) to (22), further comprising a socket configured to receive power from the main power connection, wherein the socket houses the circuitry.

(24) A lighting device comprising: a main power connection that receives power from a main power source under normal conditions; a battery; a lighting circuit including a plurality of lights, wherein the lighting circuit is configured to be powered by the main power source in a normal condition and to be powered from the battery when power from the main power source is absent; and circuitry configured to measure a temperature of the battery, and generate, when the temperature is above a predetermined threshold, a control signal to keep the temperature of the battery below the predetermined threshold.

(25) The lighting device of (24), wherein the control signal reduces power to the lighting circuit in order to keep the temperature of the battery below the predetermined threshold.

(26) The lighting device of (24) or (25), wherein power is reduced to the lighting circuit by a dimming technique.

(27) The lighting device of any one of (24) to (26), wherein the circuitry is configured to determine when power from the main power source is available and, when power from the main power source is available, the circuitry is configured to control charging of the battery based on the measured battery temperature.

(28) A thermal servo device comprising circuitry configured to: receive a temperature signal including data corresponding to a temperature of a battery, wherein the battery powers a lighting circuit when power from a main power source of the lighting circuit is absent; determine, based on the temperature signal, whether the battery temperature is greater than a predetermined threshold; and generate, when the temperature is above the predetermined threshold, a control signal to keep the temperature of the battery below the predetermined threshold.

(29) A light socket comprising: a socket interface configured to electrically connect with a light bulb; a battery; and circuitry configured to control power to the socket interface via a switch connected to the socket interface, the battery, a secondary lighting circuit, and a main power source, wherein when power from the main power source is available, the circuitry controls the power such that the switch selectively passes current from the main power source to the light bulb, and when power from the main power source is absent, the circuitry controls the power such that the circuitry selectively passes current from the battery to the light bulb or the secondary lighting circuit based on a position of the switch.

The invention claimed is:

1. A lighting device comprising:
   a main power connection configured to receive power from a main power source under normal conditions;
   a battery;
   a lighting circuit including a plurality of lights connected on a load side of a switch connecting the main power connection to the main power source, the lighting circuit being powered by the main power source in a normal condition when power from the main power source is present and the switch is closed, and being powered from the battery when power from the main power source is absent and the switch is closed; and
   circuitry configured to
      convert, via powering through a bridge rectifier, an incompatible light into a compatible light, the powering including supplying a ramped voltage to the incompatible light,
      measure a temperature of the battery,
      generate, based on a temperature threshold, a control signal to maintain the temperature of the battery below the temperature threshold,
      determine, based on an input from the switch, when the power from the main power source is absent, and
      output, based on the main power source being absent, a test signal at the main power connection,
      wherein the lighting, circuit connected on the load side of the switch appears as a substantially open circuit to the test signal.

2. The lighting device of claim 1, wherein the control signal reduces power to the lighting circuit in order to keep the temperature of the battery below the predetermined threshold.

3. The lighting device of claim 2, wherein power is reduced to the lighting circuit by a dimming technique.

4. The lighting device of claim 1, wherein the circuitry is further configured to:
   control charging of the battery based on the main power source being available and a measured battery temperature.

5. The lighting device of claim 4, wherein the circuitry is further configured to:
   determine whether the measured battery temperature is within a temperature charging range; and
   measure a voltage of the battery based on the measured battery temperature being within the temperature charging range.

6. The lighting device of claim 5, wherein the circuitry is further configured to:
   charge the battery at a first charging rate based on the measured voltage of the battery being lower than a first voltage threshold, and charge the battery at a second charging rate based on the measured voltage of the battery being greater than the first voltage threshold and lower than a second voltage threshold.

7. The lighting device of claim 6, wherein the circuitry is further configured to:
   charge the battery at a constant voltage based on the measured voltage of the battery being greater than the second voltage threshold.

8. The lighting device of claim 7, wherein the circuitry is further configured to:
   terminate charging of the battery based on a measured current of the battery being lower than a predetermined current threshold.

9. The lighting device of claim 7, wherein the constant voltage is equal to the second voltage threshold.

10. The lighting device of claim 5, wherein the temperature threshold is 60° C. and the temperature charging range is 0° C. to 45° C.

11. The lighting device of claim 6, wherein the first voltage threshold is 2.5V and the second voltage threshold is 4.2V.

12. A method of operating a lighting device, the method comprising:
   determining, using circuitry, a source of power for a lighting circuit of the lighting device, the lighting circuit including a plurality of lights connected on a load side of a switch that connects a main power connection to a main power source, the source of power being one of the main power source and a battery each when the switch is closed;
   converting, via powering through a bridge rectifier, an incompatible light into a compatible light, the powering including supplying a ramped voltage to the incompatible light;
   measuring by circuitry, a temperature of the battery;
   generating, based on a temperature threshold, a control signal to maintain the temperature of the battery below the temperature threshold;
   determining, based on an input from the switch, when the power from the main power source is absent; and
   outputting, based on the main power source being absent, a test signal at the main power connection, wherein the lighting circuit connected on the load side of the switch appears as a substantially open circuit to the test signal.

13. The method of claim 12, wherein the lighting circuit is powered by the main power source in a normal condition, and is powered from the battery when power from the main power source is absent and the switch is closed.

14. The method of claim 12, further comprising:
controlling by circuitry, charging of the battery based on the main power source being available and a measured battery temperature.

15. The method of claim 14, further comprising:
determining whether the measured battery temperature is within a temperature charging range; and
measuring a voltage of the battery based on the measured battery temperature being within the temperature charging range.

16. The method of claim 15, further comprising:
charging the battery at a first charging rate based on the measured voltage of the battery being lower than a first voltage threshold, and charge the battery at a second charging rate based on the measured voltage of the battery being greater than the first voltage threshold and lower than a second voltage threshold.

17. A light socket comprising:
a socket interface configured to electrically connect with a light bulb;
a battery; and
circuitry configured to:
  convert, via powering through a bridge rectifier, an incompatible light bulb into a compatible light bulb, the powering including supplying a ramped voltage to the incompatible light,
  control power to the socket interface via a switch connected to the socket interface and a main power source, wherein when power from the main power source is available and the switch is closed, the circuitry controls the power such that the switch passes current from the main power source to the light bulb, and when power from the main power source is absent and the switch is closed, the circuitry controls the power such that the circuitry passes current from the battery to one of the light bulb and a lighting circuit based on a position of the switch being closed,
  determine, based on an input from a main power connection, when the power from the main power source is absent, and
  output, based on the main power source being absent, a test signal at the main power connection,
wherein a plurality of devices connected on a load side of a switch connecting the main power connection to the main power source, appear as a substantially open circuit.

18. The light socket of claim 17, wherein the circuit is further configured to:
generate a switch state detection signal based on current flow generated as a result of the output of the test signal, the switch state detection signal indicating the position of the switch.

* * * * *